United States Patent
Oonami

(10) Patent No.: US 9,753,683 B2
(45) Date of Patent: Sep. 5, 2017

(54) PRINT SYSTEM

(71) Applicant: Oki Data Corporation, Tokyo (JP)

(72) Inventor: Ryoichi Oonami, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/669,040

(22) Filed: Mar. 26, 2015

(65) Prior Publication Data

US 2015/0277827 A1    Oct. 1, 2015

(30) Foreign Application Priority Data

Mar. 31, 2014  (JP) .................... 2014-070854

(51) Int. Cl.
*G06F 15/00*    (2006.01)
*G06F 3/12*    (2006.01)

(52) U.S. Cl.
CPC .......... *G06F 3/1253* (2013.01); *G06F 3/1205* (2013.01); *G06F 3/1224* (2013.01); *G06F 3/1232* (2013.01); *G06F 3/1285* (2013.01)

(58) Field of Classification Search
CPC .................................................. G06F 3/1253
USPC ....................................................... 358/1.15
See application file for complete search history.

(56) References Cited

U.S. PATENT DOCUMENTS

| | | | | |
|---|---|---|---|---|
| 2005/0111015 A1* | 5/2005 | Tsujimoto | ............ | G06K 15/005 358/1.9 |
| 2012/0002222 A1* | 1/2012 | Ohara | ................... | G06F 3/1205 358/1.9 |
| 2013/0063776 A1* | 3/2013 | Kishida | ................. | G06F 3/1205 358/1.15 |

FOREIGN PATENT DOCUMENTS

JP        2003-256180 A       9/2003

* cited by examiner

Primary Examiner — Mark Milia
(74) Attorney, Agent, or Firm — Mots Law, PLLC

(57) ABSTRACT

A print system includes: a print-function-information holding section; a host terminal; and an image formation apparatus. The host terminal includes: a print-function setting unit configured to perform print setting based on print function information held by the print-function-information holding section, and a transmission unit configured to transmit first data associating the print setting with first determination information, and to transmit second data associating the print data with second determination information. The image formation apparatus includes: a reception unit configured to receive the first data and the second data, a print control unit configured to perform print setting based on the first data, if the first determination information added to the first data and the second determination information added to the second data match with each other, and a print unit configured to print the print data based on the print setting.

9 Claims, 24 Drawing Sheets

Fig. 3

```
%!PS-Adobe-3.0
%APL_DSC_Encoding:UTF8
%APLProducer:(Version 10.8.5(Build 12F37)Quartz PS Context)
%%Title:(TestPrint)                                              ← A
%%Creator:(TextEdit: cgpdftops CUPS filter)                      ← B
%%CreationDate:(Wednesday, Sptember 25 2013 11:09:59 JST)
%%For:(Oki Taro)                                                 ← C
%%DocumentData: Clean7Bit
%%LanguageLevel: 2
%%PageOder: Ascend
%RBINNumCopies: 1
%%Pages: (atend)
%%BoundingBox: (atend)
%%EndComments
userdict/dscInfo 5 dict dup begin
/Title(TestPrint)def
/Creator(TextEdit: cgpdftops CUPS filter)def
/CreationDate(Wednesday, September 25 2013 11:09:59 JST)def
/For(oonami)def
/Pages 1 def
/end put
```

Fig. 4

```
*% Tray Switch

*OpenUI*TraySwitch: Boolean                                      ← D

*OrderDependency: 25.0 DocumentSetup *TraySwitch                 ← E

*Default TraySwitch: True                                        ← F

*TraySwitch True:"                                               ← G
1 Dict dup /TraySwitch globaldict /OK@_Custom Known not put setpagedevice"
*End

*TraySwitch False:"                                              ← H
1 Dict dup /TraySwitch false put setpagedevice"
*End

*CloseUI: *TraySwitch
```

Fig. 8

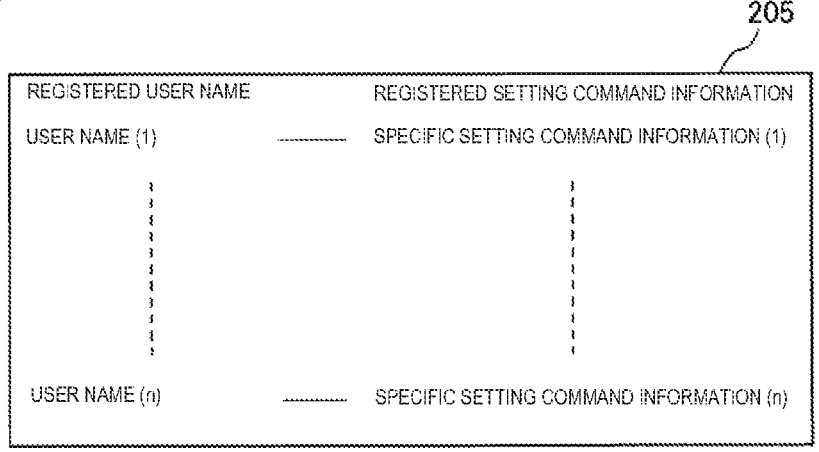

Fig. 9

```
91.0:  1 dict dup /ManualFeed false put setpagedevice
61.0:  <</OutputType(Upper)>> setpagedevice
106.0: <</CMYKTransform F>> /setdrinfo get exec
25.0:  1 dict dup /TraySwitch globaldict /OK@_Custom known not put setpagedevice
```

Fig. 10

```
1 dict dup /TraySwitch globaldict /OK@_Custom known not put setpagedevice
<</OutputType(Upper)>> setpagedevice
1 dict dup /ManualFeed false put setpagedevice
<</CMYKTransform F>> /setdrinfo get exec
```

Fig. 11

```
<OkiTaro>
1 dict dup /TraySwitch globaldict /OK@_Custom known not put setpagedevice
<</OutputType(Upper)>> setpagedevice
1 dict dup /ManualFeed false put setpagedevice
<</CMYKTransform F>> /setdrinfo get exec
```

Fig. 12

```
<OkiTaro>
1 dict dup /TraySwitch globaldict /OK@_Custom known not put setpagedevice
<</OutputType(Lower)>> setpagedevice
0 /DriverOps /Procset 2 copy resourcestatus{
pop pop findresource /settonersavetarget get exec}
{pop pop} ifelse <OkiHanako>
1 dict dup /TraySwitch globaldict /OK@_Custom known not put setpagedevice
<</OutputType(Lower)>> setpagedevice
0 /DriverOps /Procset 2 copy resourcestatus{
pop pop findresource /settonersavetarget get exec}
{pop pop} ifelse <Guest-2F>
1 dict dup /TraySwitch globaldict /OK@_Custom known not put setpagedevice
<</OutputType(Lower)>> setpagedevice
0 /DriverOps /Procset 2 copy resourcestatus{
pop pop findresource /settonersavetarget get exec}
{pop pop} ifelse
```

Fig. 13

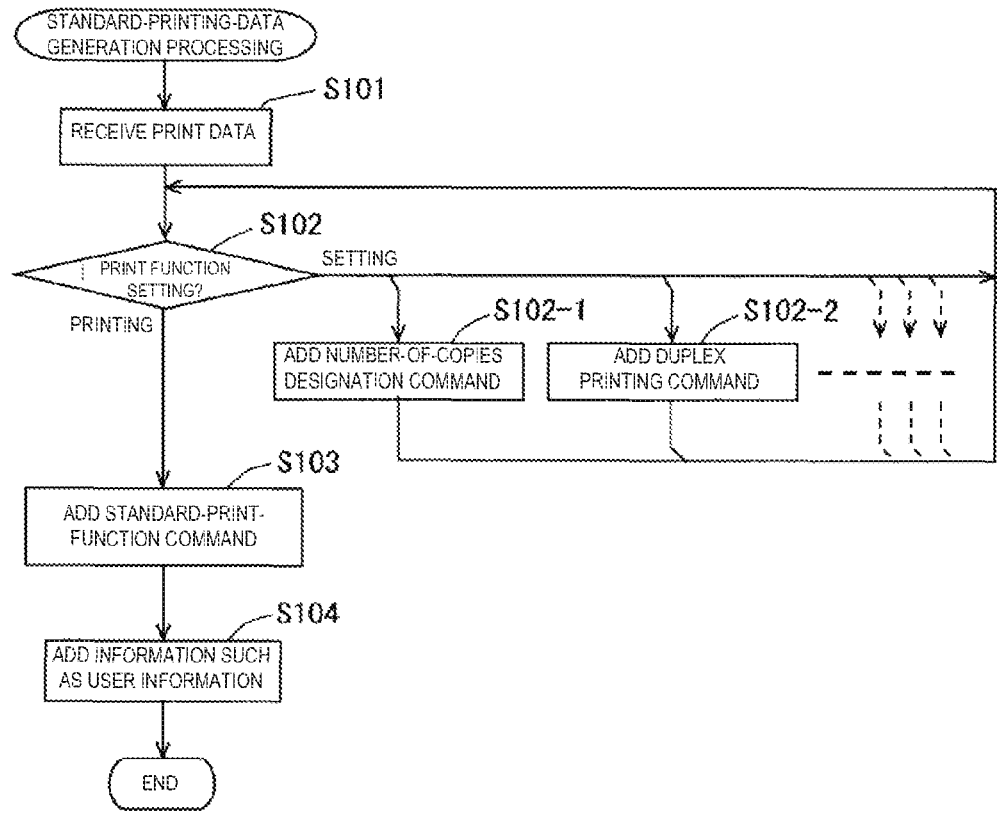

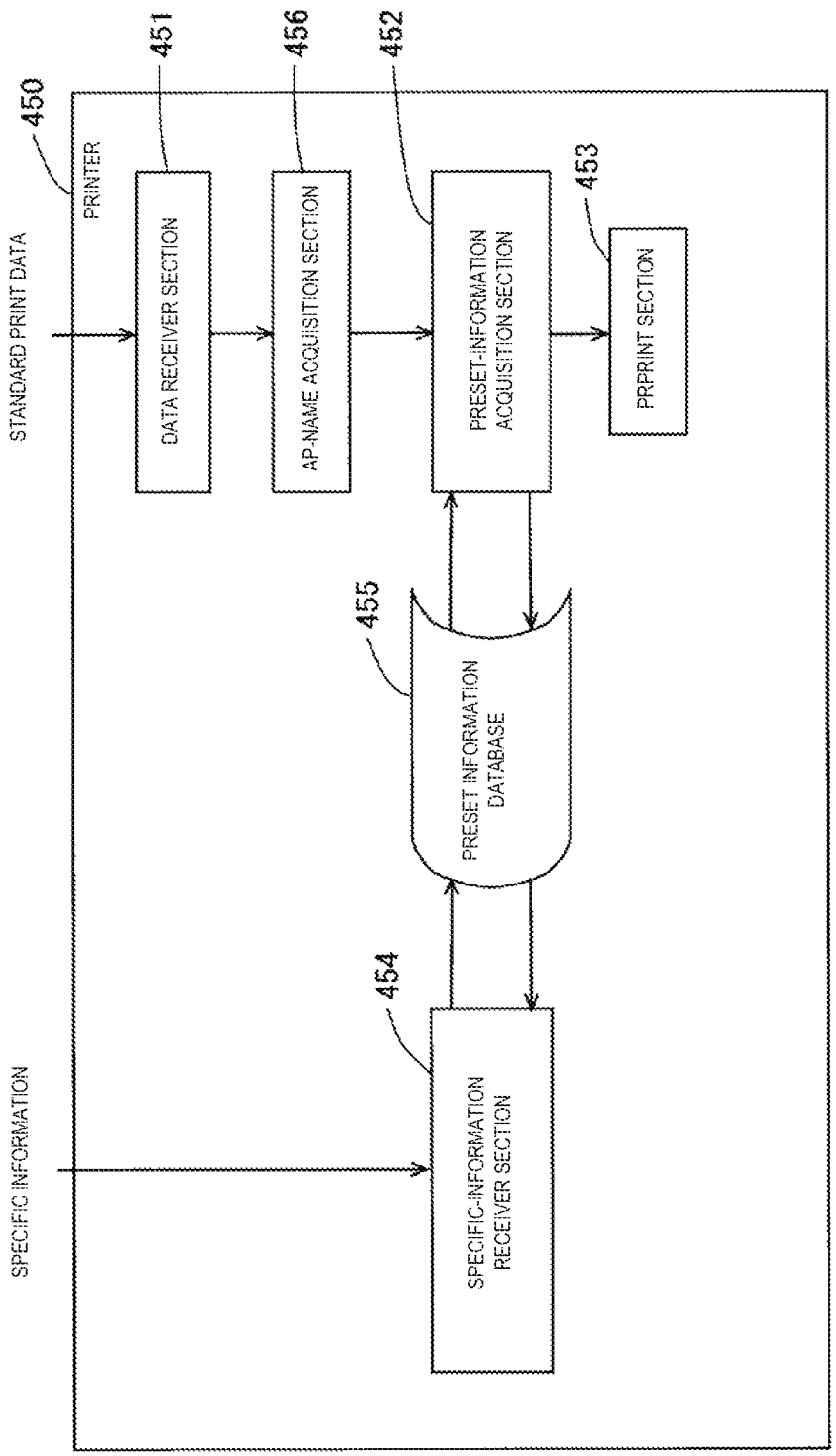

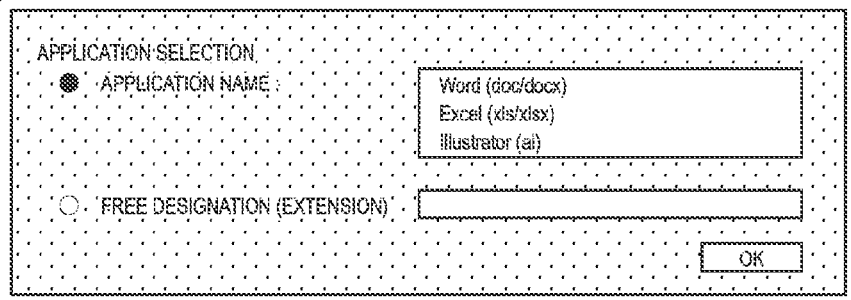

PRINT SYSTEM

CROSS REFERENCE TO RELATED APPLICATIONS

This application claims priority based on 35 USC 119 from prior Japanese Patent Application No. JP2014-070854 filed on Mar. 31, 2014, entitled "PRINT SYSTEM", the entire contents of which are incorporated herein by reference.

BACKGROUND OF THE INVENTION

1. Field of the Invention

The disclosure relates to a print system by which an operating system (OS) equipped with a printer driver supporting limited functions is enabled to operate multiple functions of a printer.

2. Description of Related Art

In general, multiple functions of a printer are selected and executed by various ways of, for example, using a dedicated printer driver, making setting in the printer, or making setting in a web page (for example, see Japanese Patent Application Publication No. 2003-256180, page 3, FIG. 1).

SUMMARY OF THE INVENTION

However, some OSs are capable of using only printer drivers equipped with just standard functions and prepared in the OSs. In this case, even if a multifunctional printer is used, such an OS cannot use many functions specific to this printer.

An aspect of the invention is a print system including: a print-function-information holding section; a host terminal; and an image formation apparatus, wherein the print system performs printing by transmitting print data from the host terminal to the image formation apparatus. The host terminal includes: a print-function setting unit configured to perform print setting based on print function information held by the print-function-information holding section+ and a transmission unit configured to transmit first data associating the print setting with first determination information, and to transmit second data associating the print data with second determination information. The image formation apparatus includes: a reception unit configured to receive the first data and the second data; a print control unit configured to perform print setting based on the first data, if the first determination information added to the first data and the second determination information added to the second data match with each other; and a print unit configured to print the print data based on the print setting.

According to this aspect of the invention, even if an OS designates use of a printer driver including only limited functions, a printer can perform printing by making use of a print function specific to the printer.

BRIEF DESCRIPTION OF THE DRAWINGS

FIG. 3 is a diagram illustrating standard print data when printing is performed using a "Generic Postscript Driver" coming with an OS.

FIG. 4 is a diagram illustrating a setting-item block example describing each piece of information in PostScript language, when a setting item is "Tray Switch".

FIG. 8 is a diagram schematically illustrating a data-holding configuration of a preset information database, in the first embodiment.

FIG. 9 is a diagram illustrating setting commands described in PostScript, to be stored in an output-command storage area, in a state where priority information is added.

FIG. 10 is a diagram illustrating the setting commands to be stored in the output-command storage area, after the setting commands are sorted and the priority information is deleted.

FIG. 11 is a diagram illustrating the setting commands to which a user name is added and which is to be outputted as specific information.

FIG. 12 is a diagram illustrating a form of preset information formed into a block for each user name and stored in the preset information database, in the first embodiment.

FIG. 13 is a flowchart illustrating a flow of standard-printing-data generation processing by a printer driver of the host PC, in the first embodiment.

FIG. 23 is a block diagram illustrating a main-part configuration of a printer included in the print system according to the fourth embodiment of the invention.

FIG. 24 is a diagram illustrating an application setting dialogue displayed by a target-AP selection section, in the fourth embodiment.

FIG. 25 is a diagram schematically illustrating a data-holding configuration of a preset information database, in the fourth embodiment.

DETAILED DESCRIPTION OF EMBODIMENTS

Figure 1:
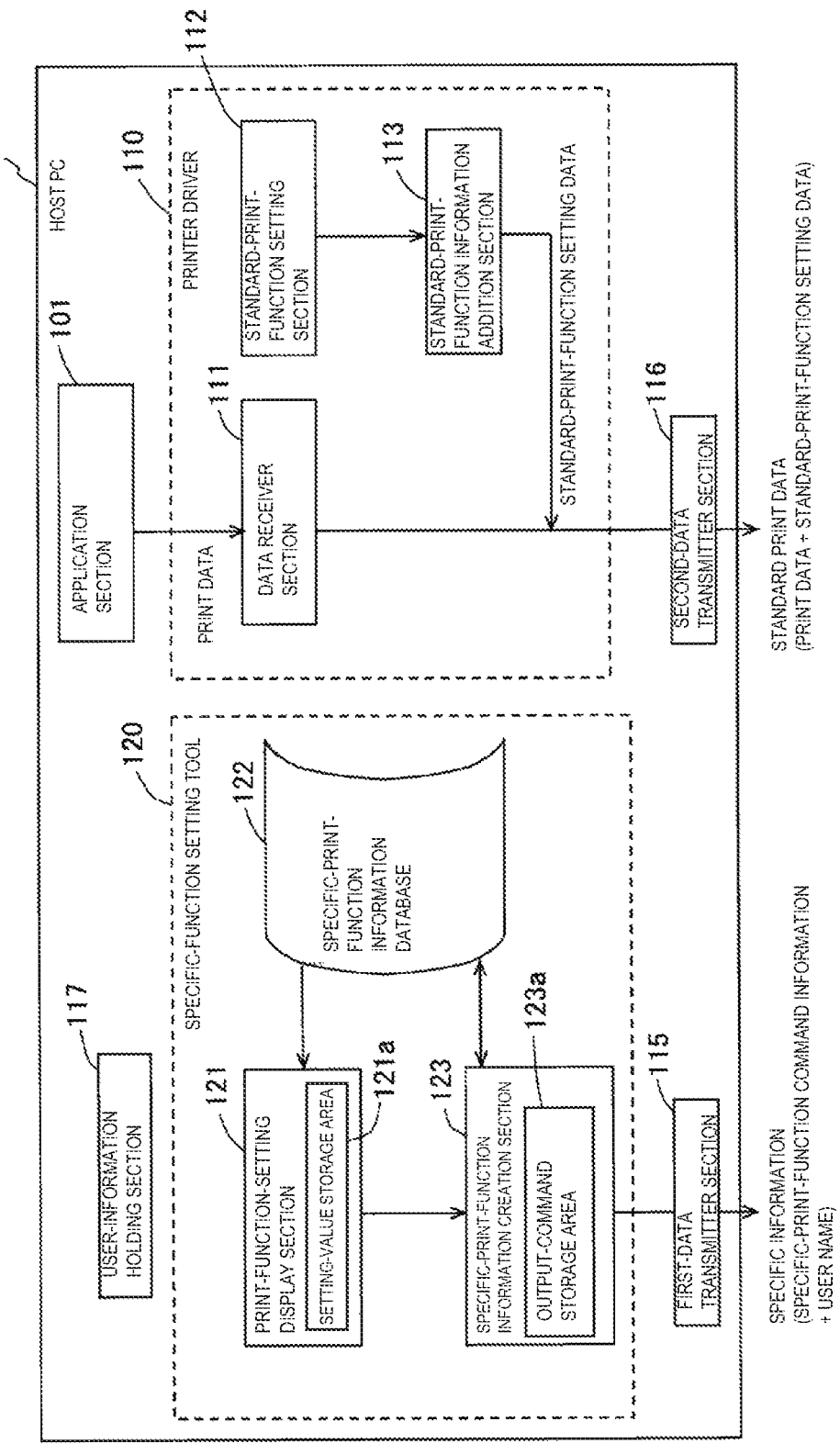
FIG. 1 is a block diagram illustrating a main-part configuration of a host terminal section of a host PC included in a print system according to a first embodiment of the invention.

Descriptions are provided hereinbelow for embodiments based on the drawings. In the respective drawings referenced herein, the same constituents are designed by the same reference numerals and duplicate explanation concerning the same constituents is omitted. All of the drawings are provided to illustrate the respective examples only.

First Embodiment

Figure 2:
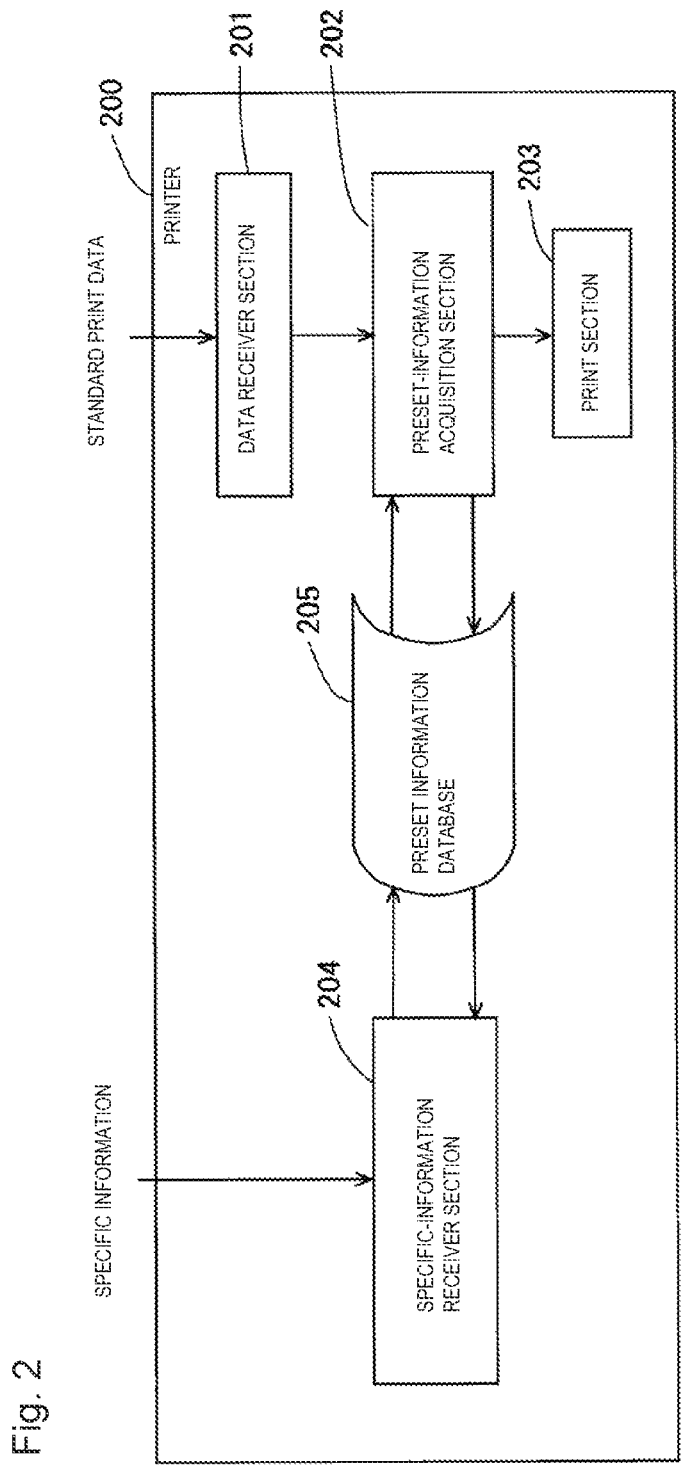
FIG. 2 is a block diagram illustrating a main-part configuration of a printer included in the print system according to the first embodiment of the invention.

FIG. 1 is a block diagram illustrating a main-part configuration of a host terminal section of host PC 100 included in a print system according to a first embodiment of the invention. FIG. 2 is a block diagram illustrating a main-part configuration of printer 200 included in the print system according to the first embodiment of the invention.

In host PC 100 illustrated in FIG. 1, application section 101 having ordinary print functions operates to create print data. Application section 101 then transmits the print data to data receiver section 111 of printer driver 110 having only standard functions. Data receiver section 111 holds the received print data. Standard-print-function setting section 112 operates when an operator desires to change print setting. Standard-print-function setting section 112 allows setting of the standard functions accompanying an OS, i.e., defined by the specifications of the OS. Examples of the standard functions include designating the number of copies, designating duplex printing, setting a paper size, designating a paper feed tray, and designating a print resolution.

Figure 5:
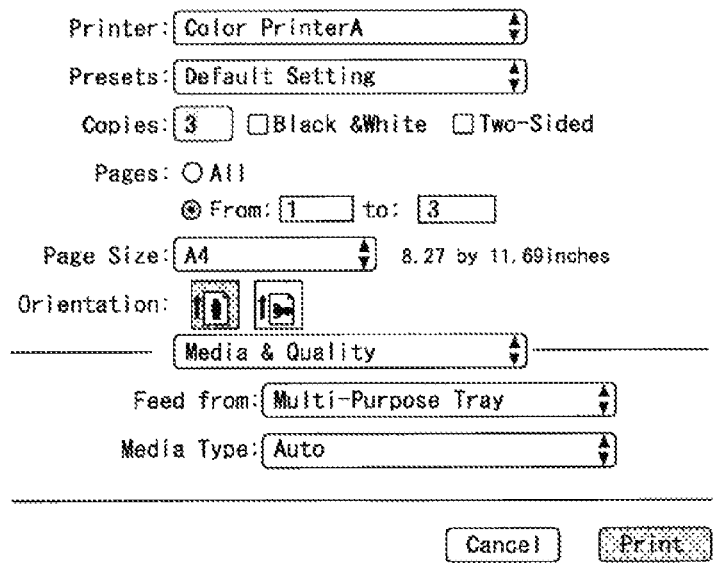
FIG. 5 is a diagram illustrating a standard-printing setting dialogue displayed on a display section belonging to a standard-print-function setting section, at the time of creating standard print data.

FIG. 5 illustrates a standard-printing setting dialogue displayed on a display section (not illustrated) belonging to standard-print-function setting section 112. The operator selects and sets the above-described items and the like, in this standard-printing setting dialogue.

Further, similarly, standard-print-function information addition section 113 handles information about the standard print functions accompanying the OS. Specifically, standard-print-function information addition section 113 converts a standard-print-function command that is set by standard-print-function setting section 112 into data, and adds this data to the print data held by data receiver section 111, as standard-print-function setting data. This standard-print-function information addition section 113 further adds data including the followings, to the standard-print-function setting data.

Application name
Document name
User name (login name)

The application name mentioned here is the name of an application when the print data is created.

The user name mentioned here can be, for example, a user name registered beforehand or a user name newly registered, in user-information holding section 117 provided in host PC 100. Further, although the user name is used here, pieces of user information such as a login name, a password, and an employee number associated with one other may be used.

Host PC 100 outputs standard print data (i.e., print data+standard-print-function setting data) to printer 200 (FIG. 2) to be described later, via second-data transmitter section 116. The standard print data is data acquired by adding the standard-print-function setting data to the print data. Here, FIG. 3 illustrates the standard print data when printing is performed using "Generic Postscript Driver" coming with the OS. In FIG. 3, an arrow B indicates an application name,
an arrow A indicates a document name, and
an arrow C indicates a user name (a login name).

Here, the standard print data is described as a combination of the print data and the standard-print-function setting data. However, specifically, the standard print data can be described as follows by using standard-printing command information serving as second function information.

Standard print data=Print data+User name (as well
as application name, document name, etc.)+
Second function information (standard-printing
command information)

Specific-function setting tool 120 allows setting of functions specific to printer 200 (FIG. 2). These functions cannot be selected and set by printer driver 110 having only the standard functions accompanying the OS. Examples of the functions specific to printer 200 include an automatic tray switching function,
an extra-fine-line correction function, and
a color-matching precision function.

Print-function-setting display section 121 acquires settable function information from specific-print-function information database 122 serving as a print-function-information holding section that manages specific print function information. Print-function-setting display section 121 then displays a function list of the acquired specific print function information, thereby allowing the operator to perform function selection. The specific print function information includes a setting item name, a setting value, a default setting value, a setting priority (order), and a setting command, which are managed in association with each set item. Here, FIG. 4 illustrates a setting-item block example that describes pieces of information in PostScript language, when the setting item is "Tray Switch". In FIG. 4, an arrow D indicates a setting item name,
an arrow E indicates a setting priority (order),
an arrow F indicates a default setting value, an arrow G indicates a setting command A (True), and an arrow H indicates a setting command B (False).

These pieces of information can be described in XML language or the like, according to an environment and a language to be used.

Print-function-setting display section 121 stores an initial value for a settable function, in setting-value storage area 121a. The initial value mentioned here is a collection of pieces of information about the default setting value (indicated by arrow F in FIG. 4), and the setting item as well as the setting value thereof are stored. Print-function-setting display section 121 displays a print setting dialogue based on these pieces of stored data.

Figure 6:
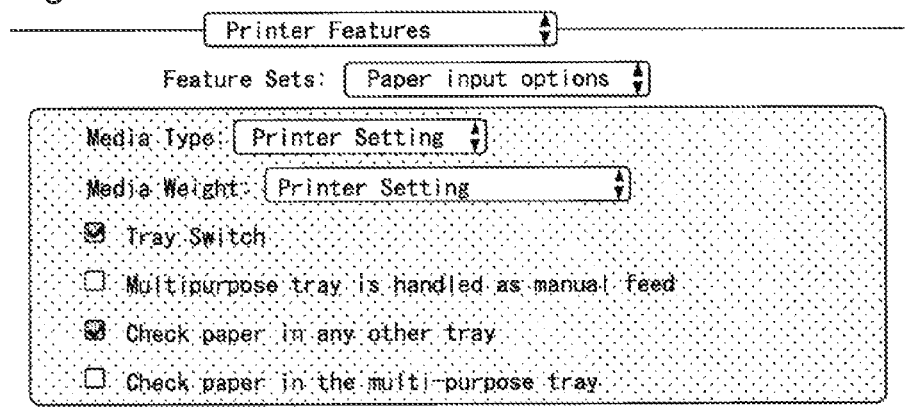
FIG. 6 is a diagram illustrating an example of a print setting dialogue displayed on a print-function-setting display section, at the time of creating specific information.

FIG. 6 illustrates an example of the print setting dialogue displayed by print-function-setting display section 121. The operator changes the setting contents of the print setting dialogue in the print setting dialogue, to obtain a favorite printing result.

Print-function-setting display section 121 successively updates setting-value information according to the change, and stores this information in setting-value storage area 121a. Based on the setting-value information stored in setting-value storage area 121a, specific-print-function information creation section 123 creates specific information to serve as first data to be transmitted to printer 200 via first-data transmitter section 115.

Therefore, specific-print-function information creation section 123 extracts the setting-value information, which includes each setting item and the setting value corresponding thereto and is stored in setting-value storage area 121a. Specific-print-function information creation section 123 also extracts the setting command and priority (order) corresponding to the setting value, of the setting item block (see FIG. 4) corresponding to the setting value item, from specific-print-function information database 122, and stores the extracted setting command and priority (order) in output-command storage area 123a.

Upon storing the output command for all the setting items in output-command storage area 123a, specific-print-function information creation section 123 sorts the stored setting commands in an output order based on the stored priority (order) information. This sorting is performed because a printing result may vary according to a set order. For example, for a PostScript description method, commands are sorted so that a command with a value smaller in priority (order) is outputted earlier. Upon completion of the sorting, specific-print-function information creation section 123 deletes the priority (order) information from the data in output-command storage area 123a.

Next, specific-print-function information creation section 123 stores a user name in output-command storage area 123a.

Figure 7:
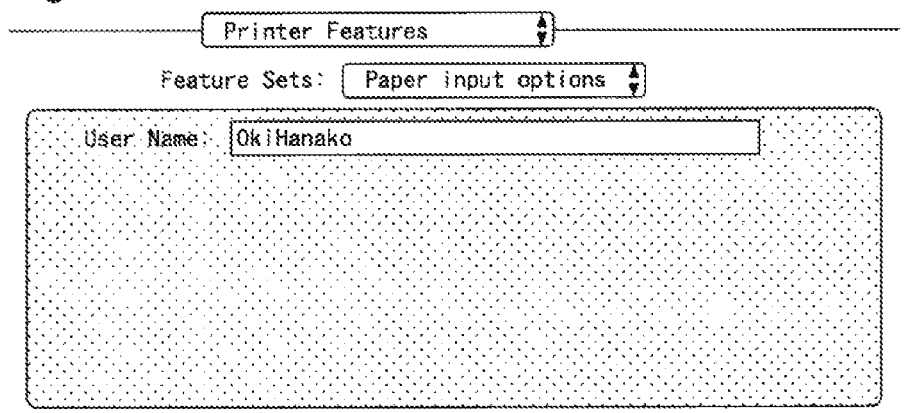
FIG. 7 is a diagram illustrating a user-name registration dialog displayed on the print-function-setting display section, at the time of registering a user name to be included in the specific information.

The user name mentioned here can be, for example, a user name registered beforehand, or a user name newly registered, in user-information holding section 117 provided in host PC 100. The newly registered user name is registered via a user-name registration dialog displayed on print-function-setting display section 121, as illustrated in FIG. 7. Here, any of pieces of user information such as a login name, a password, and an employee number associated with one another may be used other than the user name.

Finally, specific-print-function information creation section 123 transmits the specific information (specific-print-function command information (first function information)+user name) serving as the first data, to printer 200 via first-data transmitter section 115, thereby completing the processing. The first data is formed by adding the use name of the user information, to the specific-print-function command information serving as the first function information corresponding to the sorted setting commands stored in output-command storage area 123a. First-data transmitter section 115 and second-data transmitter section 116 combined corresponds to a transmission unit.

FIG. 9 illustrates the setting commands (the specific-print-function command information) described in Post-Script, to be stored in output-command storage area 123a, in a state where the priority information is added. FIG. 10 illustrates the sorted setting commands to be stored in output-command storage area 123a, in a state after the priority information is deleted. FIG. 11 illustrates the setting commands to which the user name is further added and which is to be outputted as the specific information.

In FIG. 1, print-function-setting display section 121 corresponds to a print-function setting unit. Further, print-function-setting display section 121, specific-print-function information creation section 123, printer driver 110, and first-data transmitter section 115 as well as second-data transmitter section 116 combined corresponds to a host terminal.

In FIG. 2, in printer 200 serving as an image formation apparatus, specific-information receiver section 204 receives the specific information transmitted from specific-function setting tool 120 of host PC 100, and extracts the user information added to the specific information. The user name extracted from the specific information is hereinafter referred to as "specific-setting user name" serving as first determination information.

Here, preset information database 205 is described. FIG. 8 is a diagram schematically illustrating a data-holding configuration of preset information database 205. As illustrated in FIG. 8, preset information database 205 manages data registered or overwritten by specific-information receiver section 204, as described later. Here, as illustrated in FIG. 8, it is assumed that user names in a registered-user-name column are registered as a user name (1) to a user name (n). Further, specific-setting command information for each of the user names is registered in association with the user name in a registered-setting-command-information column. However, actually, the setting commands (specific-print-function command information) are formed into a block for each of the user names such as "OkiTaro", "OkiHanako", and "Guest-2F", as illustrated in FIG. 12, for example.

Specific-information receiver section 204 searches the user names registered in preset information database 205, and determines whether the specific-setting user name newly extracted from the specific information is included therein. When the specific-setting user name is not registered in preset information database 205, specific-information receiver section 204 registers the currently received specific information in preset information database 205, as a new registered user name and new registered setting command information associated with each other. When the specific-setting user name is already registered in preset information database 205, specific-information receiver section 204 overwrites the corresponding registered specific-setting command information, with the new specific-print-function command information.

Further, in printer 200, data receiver section 201 receives the standard print data (print data+standard-print-function setting data) transmitted from printer driver 110 of host PC 100, and holds the received standard print data. Preset-information acquisition section 202 extracts the user information included in the standard-print-function setting data, from the standard print data held by data receiver section 201. The user name extracted here from the standard print data is hereinafter referred to as "standard setting user name" serving as second determination information.

Preset-information acquisition section 202 searches the user names registered in preset information database 205, to determine whether the standard setting user name extracted from the standard print data held by data receiver section 201 is included therein. When the standard setting user name is registered in preset information database 205, preset-information acquisition section 202 acquires the corresponding specific-setting command information from preset information database 205. Preset-information acquisition section 202 adds the acquired specific-setting command information to the standard-print-function setting data of the standard print data held by data receiver section 201, and then transmits the result to print section 203. When the standard setting user name is not registered in preset information database 205, preset-information acquisition section 202 transmits the standard print data to print section 203, without adding any specific-setting command information.

Here, preset-information acquisition section 202 searches the user names registered in preset information database 205 based on the user name, and determines whether the standard setting user name extracted from the standard print data held by data receiver section 201 is included therein. However, preset-information acquisition section 202 may perform a search based on any of pieces of user information such as a login name, a password, and an employee number associated with each other.

Print section 203 executes printing on a predetermined recording medium, by an existing printing process based on various function setting instructions accompanying the print data.

In FIG. 2, data receiver section 201 and specific-information receiver section 204 combined corresponds to a reception unit, and preset-information acquisition section 202 corresponds to a print control unit.

Next, a flow of operation (data processing) in each section of host PC 100 and printer 200 is described with reference to a flowchart illustrated in each of FIGS. 13 to 16.

First, standard-printing-data generation processing by printer driver 110 of host PC 100 is described with reference to the flowchart illustrated in FIG. 13.

Printer driver 110 receives the print data created by application section 101 in data receiver section 111, and holds the received print data (step S101). In this printing, when an operator sets the standard print functions that are the functions accompanying the OS (SETTING in step S102), the standard-printing setting dialogue (FIG. 5) is displayed on a display section (not illustrated) of standard-print-function setting section 112.

The operator selects and sets the above-described ordinary print functions such as designating the number of copies, designating duplex printing, setting a paper size, designating a paper feed tray, and designating a print resolution. As the operator performs so, standard-print-function setting section 112 and standard-print-function information addition section 113 convert these commands into data, and add this data to the print data as the standard-print-function setting data in step S102-1, step S102-2, and so on. Note that the default setting values are initially set for these functions and therefore, the setting of these functions is performed only when the initial setting values are changed.

When changing the standard print function setting is completed or when no function setting is performed (PRINTING in step S102), standard-print-function information addition section 113 converts the standard-print-function command set by standard-print-function setting section 112 into data, and adds this data to the print data held in data receiver section 111, as the standard-print-function setting data (step S103). Further, standard-print-function information addition section 113 adds a user name (a login name), an application name, and a document name to the standard-print-function setting data (step S104), thereby completing this processing of creating the standard print data (print data+standard-print-function setting data). The standard print data created here is transmitted to data receiver section 201 of printer 200, as described above.

Figure 14:
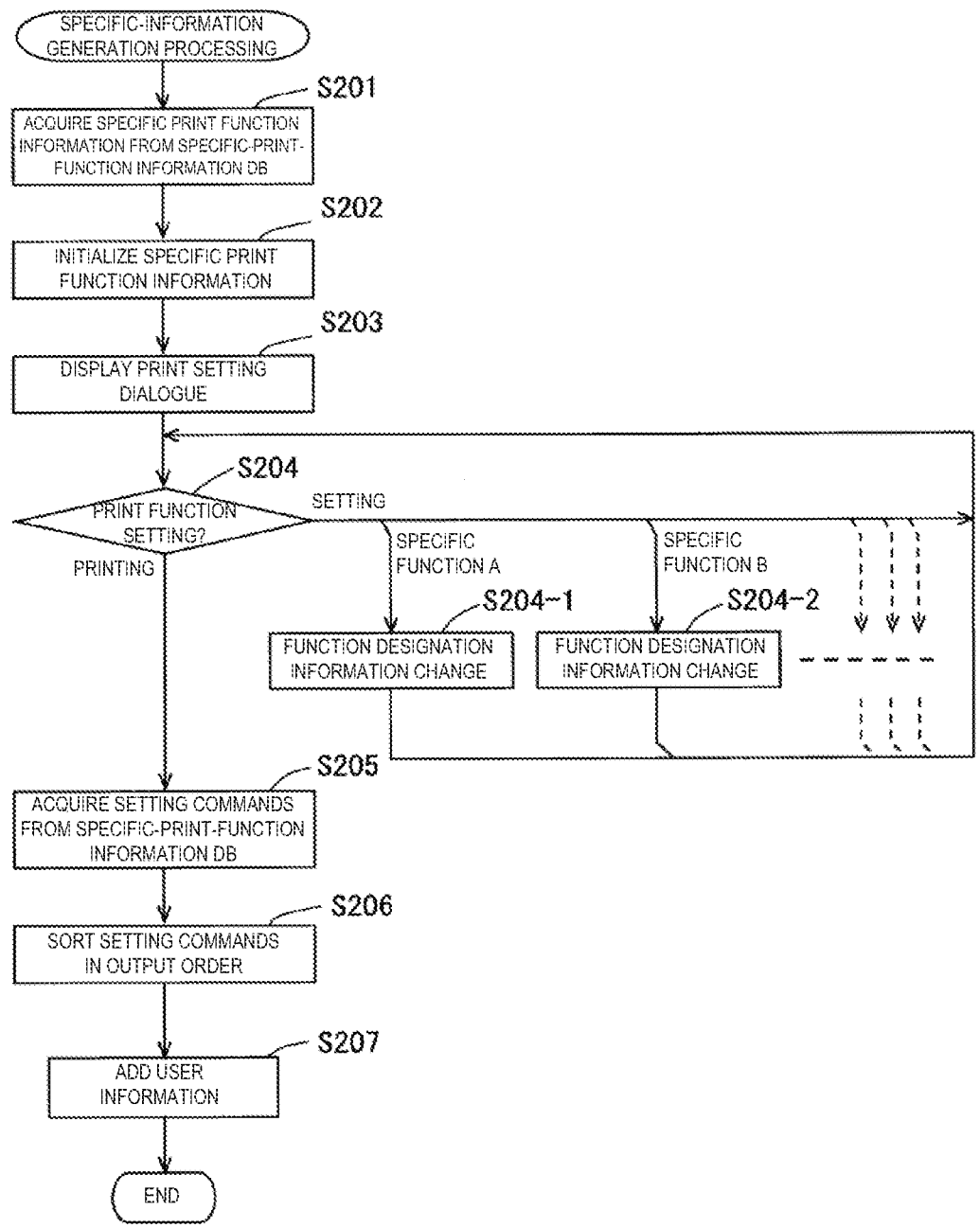
FIG. 14 is a flowchart illustrating a flow of specific-information generation processing by a specific-function setting tool of the host PC, in the first embodiment.

Next, specific-information generation processing by specific-function setting tool 120 of host PC 100 is described with reference to the flowchart illustrated in FIG. 14.

Print-function-setting display section 121 acquires settable specific print function information from specific-print-function information database 122 that manages the specific print function information (step S201). Print-function-setting display section 121 then stores each initial value of the specific print function information, namely, the default setting value, in setting-value storage area 121*a* (step S202). Print-function-setting display section 121 then displays the print setting dialogue (FIG. 6), by using this default setting value as an initial setting value (step S203).

When the operator changes setting of the specific print function information (SETTING in step S204), print-function-setting display section 121 performs as follows. As the operator selects and sets the above-described specific functions such as the automatic tray switching function, the extra-fine-line correction function (indicated as SPECIFIC FUNCTIONS A, B, . . . in FIG. 14), and the color-matching precision function, print-function-setting display section 121 successively updates the setting-value information according to the change, and stores this information in setting-value storage area 121*a* (step S204-1, step S204-2, and so on).

When changing the specific print function setting is completed or when no function setting is performed (PRINTING in step S204), specific-print-function information creation section 123 acquires the setting commands and priority (order) corresponding to the setting value of each setting item. Specific-print-function information creation section 123 then stores the acquired setting commands and priority (order), in output-command storage area 123*a* (step S205), and sorts the stored setting commands in an output order based on the stored priority (order) information (step S206).

Finally, specific-print-function information creation section 123 adds the user name to the specific-print-function command information representing the sorted setting commands to be stored in output-command storage area 123*a* (step S207), thereby completing the processing of creating the specific information (specific-print-function command information+user name). The specific information created here is transmitted to specific-information receiver section 204 of printer 200, as described above.

For example, the user information (the login name) registered beforehand in a not-illustrated holding section of host PC 100 is used as the initial value of the user name. However, as illustrated in FIG. 7, the user-name registration dialog may be displayed on print-function-setting display section 121, and an arbitrary user name may be registered in this dialog.

Next, preset-information registration processing by specific-information receiver section 204 of printer 200 (FIG. 2) is described with reference to the flowchart illustrated in FIG. 15.

Specific-information receiver section 204 receives the specific information transmitted from specific-function setting tool 120 of host PC 100, and holds the received specific information (step S301). Specific-information receiver section 204 then extracts the user information (the specific-setting user name) added to the specific information (step S302). Specific-information receiver section 204 then searches the registered user names (FIG. 8) in preset information database 205 (step S303), and determines whether the specific-setting user name newly extracted from the specific information is included therein (step S304).

When the specific-setting user name newly extracted is included in the registered user names, in other words, when the specific-setting user name is registered in preset information database 205 (Yes in step S304), specific-information receiver section 204 overwrites the corresponding registered specific-setting command information (FIG. 8), with the new specific-print-function command information (step S305). On the other hand, when the specific-setting user name newly extracted is not included in the registered user names, i.e., when the specific-setting user name is not yet registered in preset information database 205 (No in step S304), specific-information receiver section 204 registers the currently received specific information in preset information database 205, as a new registered user name and new registered setting command information associated with each other (step S306).

In this way, specific-information receiver section 204 updates the contents of preset information database 205 each time new specific information arrives.

Figure 16:
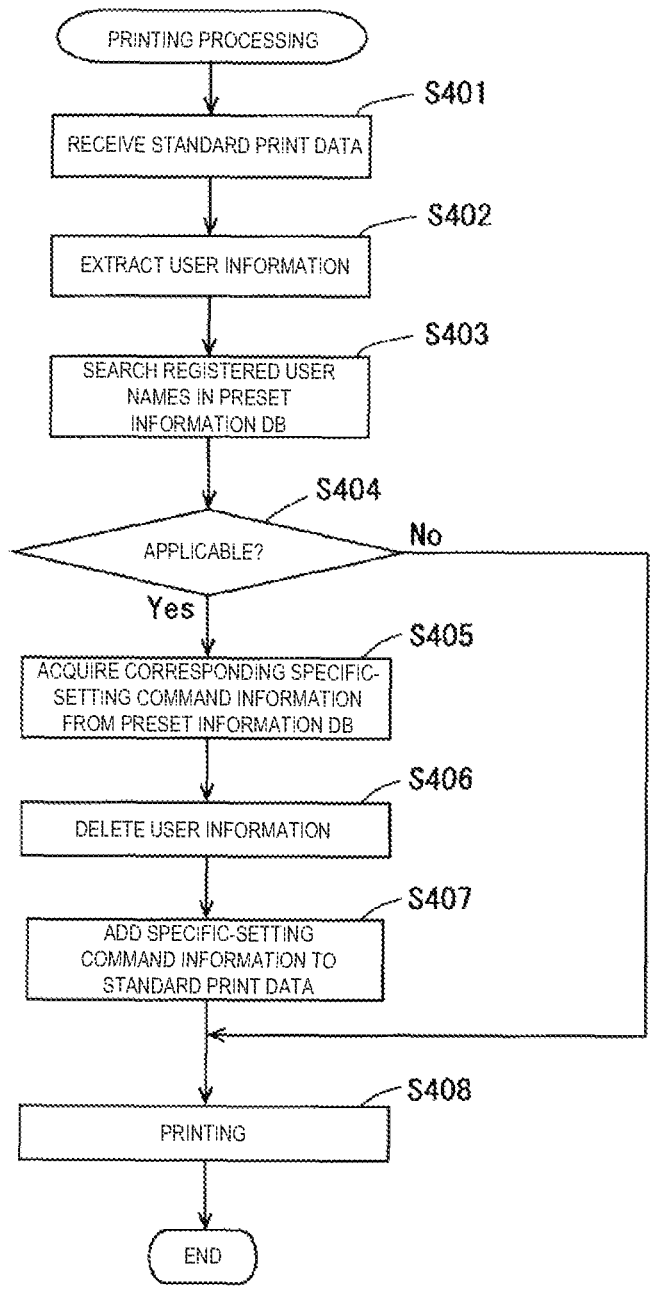
FIG. 16 is a flowchart illustrating a flow of printing processing by the printer, in the first embodiment.

Next, printing processing by printer 200 is described with reference to the flowchart illustrated in FIG. 16.

In printer 200, data receiver section 201 receives the standard print data transmitted from printer driver 110 of host PC 100, and holds the received standard print data (step S401). Preset-information acquisition section 202 then extracts the user information (the standard setting user name) included in the standard-print-function setting data, from this standard print data (step S402). Preset-information acquisition section 202 then searches the registered user names (FIG. 8) in preset information database 205 (step S403), and determines whether the standard setting user name extracted from the standard print data is included therein (step S404).

When the standard setting user name extracted from the standard print data is included in the registered user names, i.e., when the applicable user name is present in preset information database 205 (Yes in step S404), preset-information acquisition section 202 acquires the specific-setting command information except the user name, from the corresponding preset information in preset information database 205 (step S405 and step S406). Preset-information acquisition section 202 then adds the specific-setting command information to the standard-print-function setting data of the standard print data held by data receiver section 201, and transmits the result to print section 203 (step S407).

When the standard setting user name is not registered in preset information database 205, i.e., when no applicable user name is present in preset information database 205 (No in step S404), preset-information acquisition section 202 transmits the standard print data to print section 203, without adding any specific-setting command information. Print section 203 executes printing on a predetermined recording medium by an existing printing process, based on various function setting instructions accompanying the print data (step S408).

As described above, according to the print system of the first embodiment illustrated in FIGS. 1 and 2, the specific print function commands not prepared by printer driver 110 of the OS are set by the operator, by using specific-function setting tool 120 of host PC 100. These specific print function commands are associated with the user names and stored in preset information database 205 provided in printer 200. Upon receipt of the standard print data from printer driver 110, printer 200 adds the specific print function command, which corresponds to the same user name stored in preset information database 205, to the standard print data. Printer 200 then executes the printing, based on the various function setting instructions accompanying the print data.

Therefore, according to the print system of the present embodiment, even in an OS that can use only a standard printer driver accompanying the OS as a printer driver for printing, setting can be easily performed from a host PC, for various print functions specific to a printer and becoming effective only for a document to be printed.

Moreover, in the present embodiment, the user name is used for both of the first determination information and the second determination information. However, this is not limitative. The first determination information and the second determination information may be different, as long as matching between the first data and the second data can be determined. For example, any combination of the user name, the login name, the password, the employee number, and the like described above as examples may be adopted as a combination of the first determination information and the second determination information.

Second Embodiment

Figure 17:
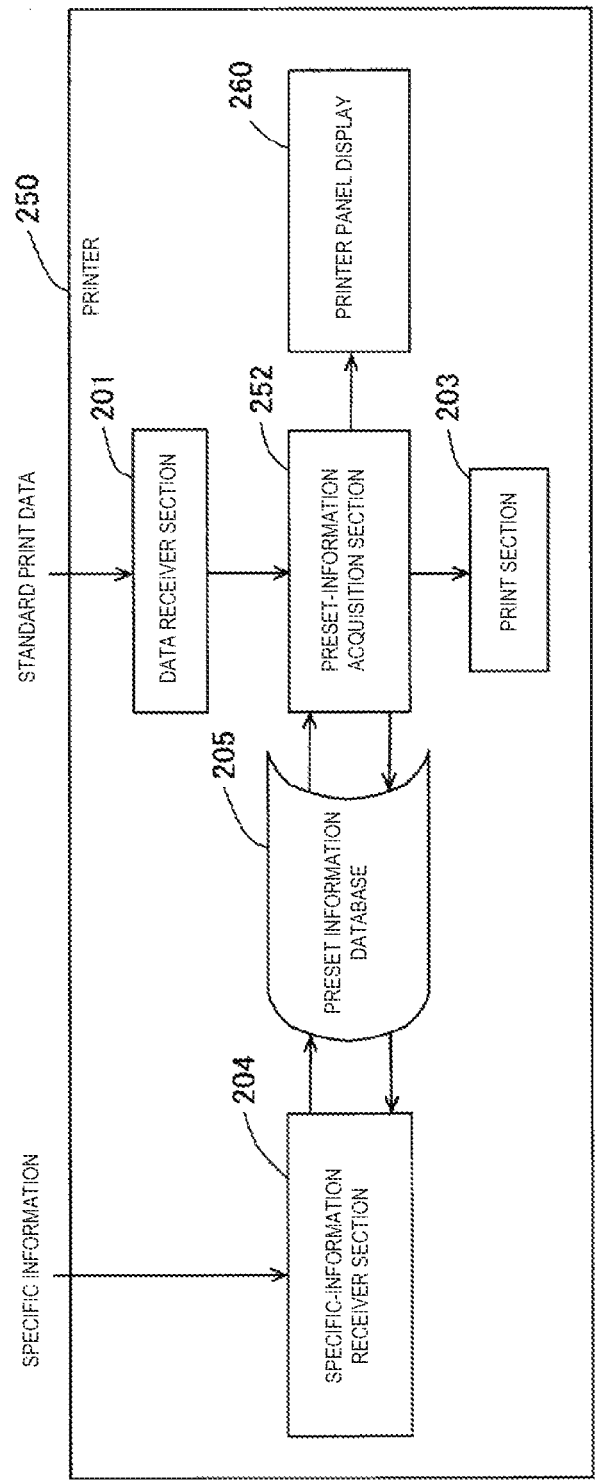
FIG. 17 is a block diagram illustrating a main-part configuration of a printer included in a print system according to a second embodiment of the invention.

FIG. 17 is a block diagram illustrating a main-part configuration of printer 250 in a print system according to a second embodiment of the invention. The print system adopting this printer 250 is different from the print system of the first embodiment illustrated in FIGS. 1 and 2, mainly in that printer panel display section 260 is added to printer 250 and this addition is accompanied by a change in processing contents of preset-information acquisition section 252. Therefore, when each part of this print system employing printer 250 is common to the corresponding part of the print system according to the first embodiment (FIGS. 1 and 2), this part is provided with the same reference numeral as that in the first embodiment or described without using the drawings. Accordingly, the difference is mainly described.

A host PC in the present embodiment is similar to host PC 100 (FIG. 1) of the first embodiment and therefore is not described here. However, host PC 100 of FIG. 1 is referred to as necessary in the following description.

Figure 15:
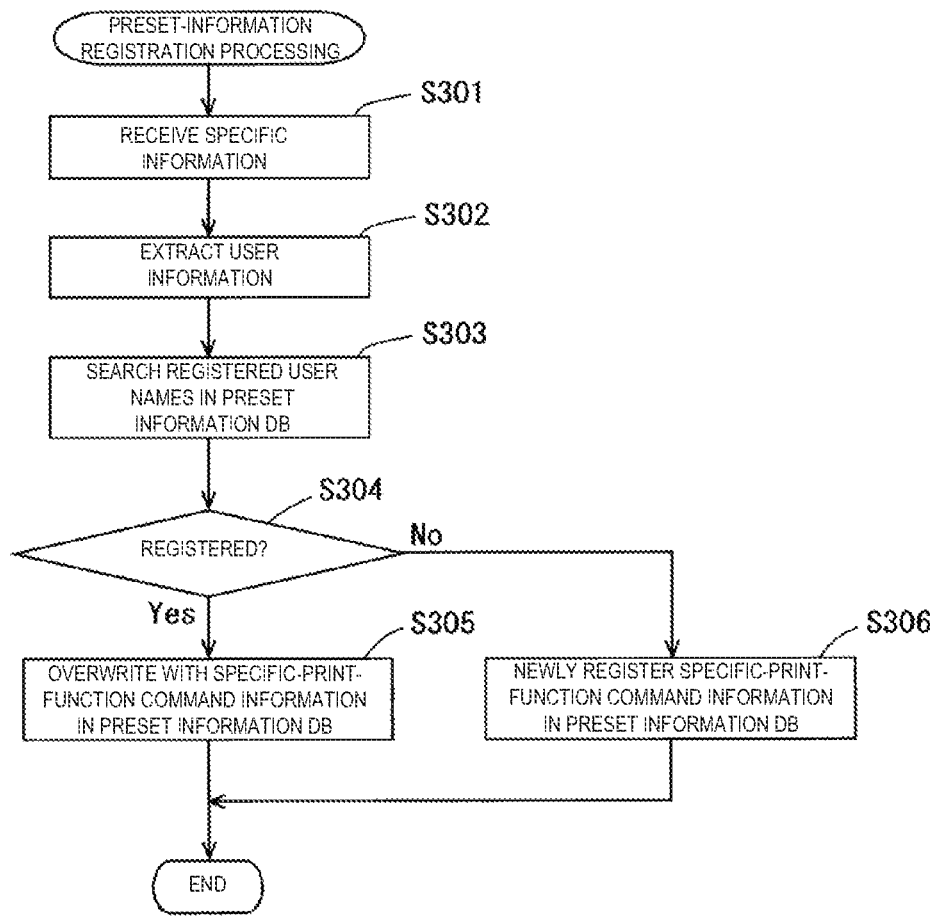
FIG. 15 is a flowchart illustrating a flow of preset-information registration processing by a specific-information receiver section of the printer, in the first embodiment.

Printer 250 illustrated in FIG. 17 is similar to that in the first embodiment, in terms of the configurations of specific-information receiver section 204 and preset information database 205, as well as the preset-information registration processing for preset information database 205 illustrated in the flowchart of FIG. 15. Therefore, these configurations and processing are not described here.

In printer 250 illustrated in FIG. 17, data receiver section 201 receives standard print data (print data+standard-print-function setting data) transmitted from printer driver 110 of host PC 100 (FIG. 1), and holds the received standard print data. Preset-information acquisition section 252 extracts user information included in standard-print-function setting data from the standard print data held by data receiver section 201. The user name extracted here from the standard print data is referred to as "standard setting user name".

Preset-information acquisition section 252 searches registered user names in preset information database 205, and determines whether the standard setting user name extracted from the standard print data held by data receiver section 201 is included therein. When the standard setting user name is registered in preset information database 205, preset-information acquisition section 252 acquires the corresponding specific-setting command information from preset information database 205, and adds the acquired specific-setting command information to the standard-print-function setting data of the standard print data held by data receiver section 201. Preset-information acquisition section 252 then transmits the result to print section 203. Print section 203 executes printing on a predetermined recording medium by an existing printing process based on various function setting instructions accompanying the print data.

Figure 18:
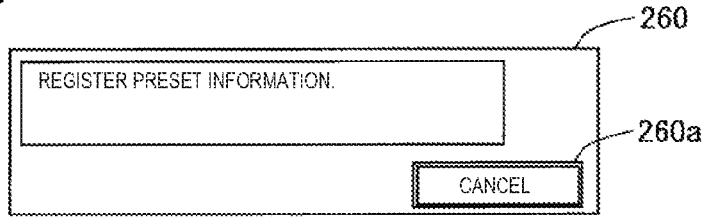
FIG. 18 is a diagram illustrating an example of a message displayed by a printer panel display section, in the second embodiment.

When the standard setting user name is not registered in preset information database 205, preset-information acquisition section 252 causes printer panel display section 260, serving as a notification unit, to display a message. The message displays contents prompting creation of the corresponding specific information (preset information) including specific-print-function command information and a user name by using specific-function setting tool 120 (FIG. 1), and registration of the created preset information in preset information database 205. FIG. 18 is a diagram illustrating an example of the message displayed on printer panel display section 260.

While the message is displayed, printing processing is suspended. The printing processing is resumed, when the specific information (preset information) is created by specific-function setting tool 120 and then registered in preset information database 205. The printing processing is cancelled, when cancel button 260a (FIG. 18) disposed in printer panel display section 260 is pressed while the message is displayed.

Figure 19:
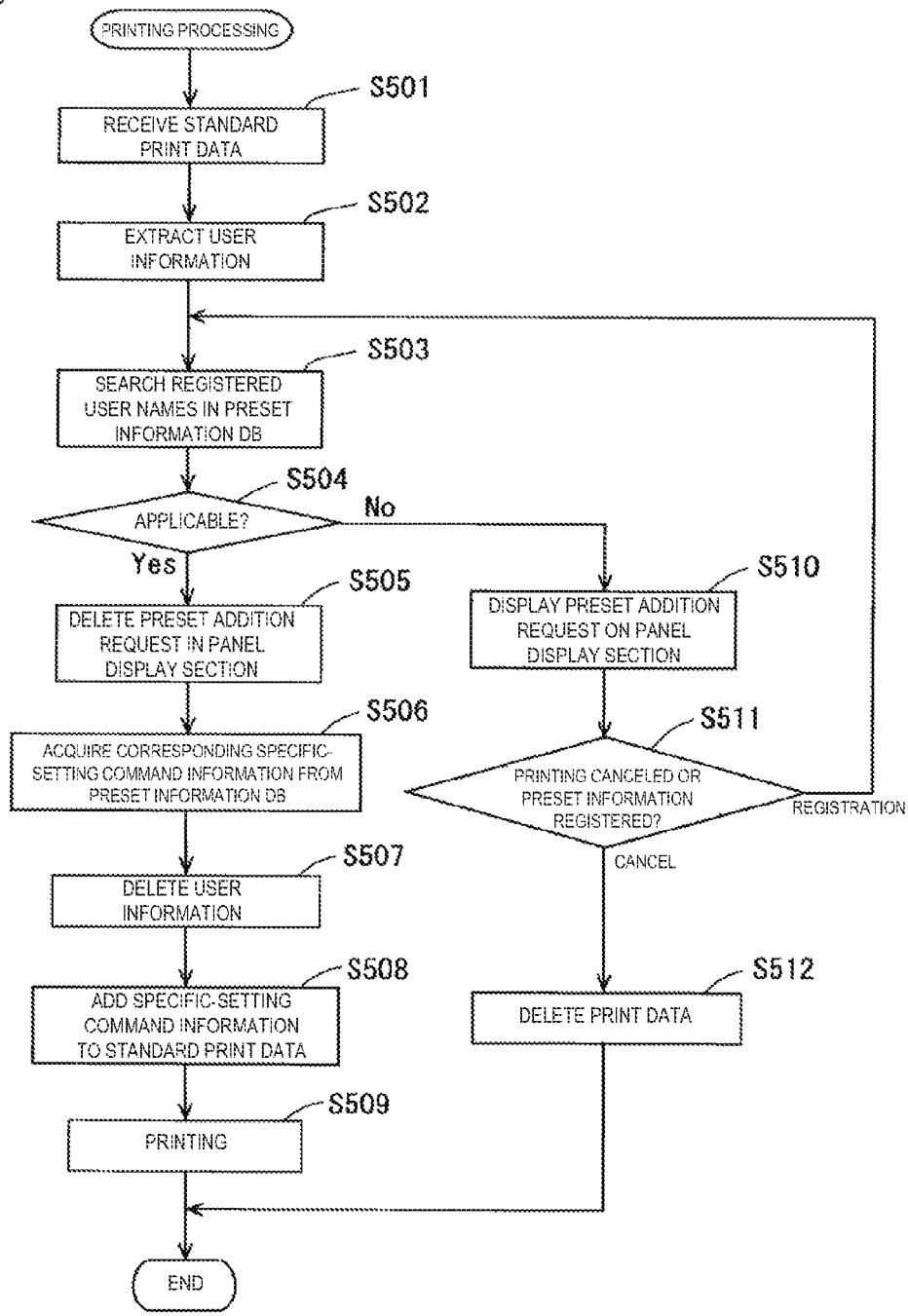
FIG. 19 is a flowchart illustrating a flow of printing processing by the printer, in the second embodiment.

The printing processing in printer 250 thus configured is described with reference to a flowchart illustrated in FIG. 19.

In printer 250, data receiver section 201 receives the standard print data transmitted from printer driver 110 of host PC 100 (FIG. 1), and holds the received standard print data (step S501). Preset-information acquisition section 252 extracts the user information (the standard setting user name) included in the standard-print-function setting data from this standard print data (step S502). Preset-information acquisition section 252 then searches the registered user names (FIG. 8) in preset information database 205 (step S503), and determines whether the standard setting user name extracted from the standard print data is included therein (step S504).

When the standard setting user name extracted from the standard print data is included in the registered user names, i.e., when the applicable user name is present in preset information database 205 (Yes in step S504), preset-information acquisition section 252 deletes a message when the message is displayed on printer panel display section 260 (step S505). Preset-information acquisition section 252 then acquires the specific-setting command information except the user name, from the corresponding preset information in preset information database 205 (step S506 and step S507). Preset-information acquisition section 252 then adds the acquired specific-setting command information to the standard-print-function setting data of the standard print data held by data receiver section 201, and transmits the result to print section 203 (step S508). Print section 203 executes printing on a predetermined recording medium by an existing printing process based on various function setting instructions accompanying the print data (step S509).

On the other hand, when the standard setting user name extracted from standard print data is not included in the registered user names in step S504, i.e., when no applicable user name is present in preset information database 205 (No in step S504), preset-information acquisition section 252 causes printer panel display section 260 to display the message. The message displays the contents prompting creation of the specific information (the preset information) by using specific-function setting tool 120 (FIG. 1), and registration of the created specific information in preset information database 205 (step S510).

Here, the printing processing is suspended to monitor whether cancel button 260a (FIG. 18) of printer panel display section 260 is pressed or the preset information is newly registered (step S511). When an operator creates the specific information and registers new preset information in preset information database 205 upon being prompted by the message displayed by printer panel display section 260 (REGISTER in step S511), the processing returns to step S503 in which the registered user names of preset information database 205 are searched again. Afterwards the processing from step S504 to step S511 is repeated.

On the other hand, when a press of cancel button 260a is detected in step S511 (CANCEL in step S511), the standard print data stored in data receiver section 201 is deleted in step S512, which completes the printing processing.

In the print system of the first embodiment, when desired preset information is not registered in preset information database 205 of printer 200, the printing is performed based on only the standard function without adding any specific print function command. However, in the print system of the present embodiment, when the desired preset information is not registered, the printing processing is suspended to prompt the operator to register the corresponding preset information, and the printing is then executed based on the desired function setting upon registration of the new preset information.

Therefore, the print system of the present embodiment produces the following effect in addition to the effect of the first embodiment. When the printing starts in a state where the desired preset information is not registered, the processing is suspended and the message promoting the registration of new preset information is displayed. The printing is resumed upon completion of the registration of the new preset information. Therefore, the printing can be executed by sufficiently making use of the functions of the printer, on every occasion.

Third Embodiment

Figure 20:
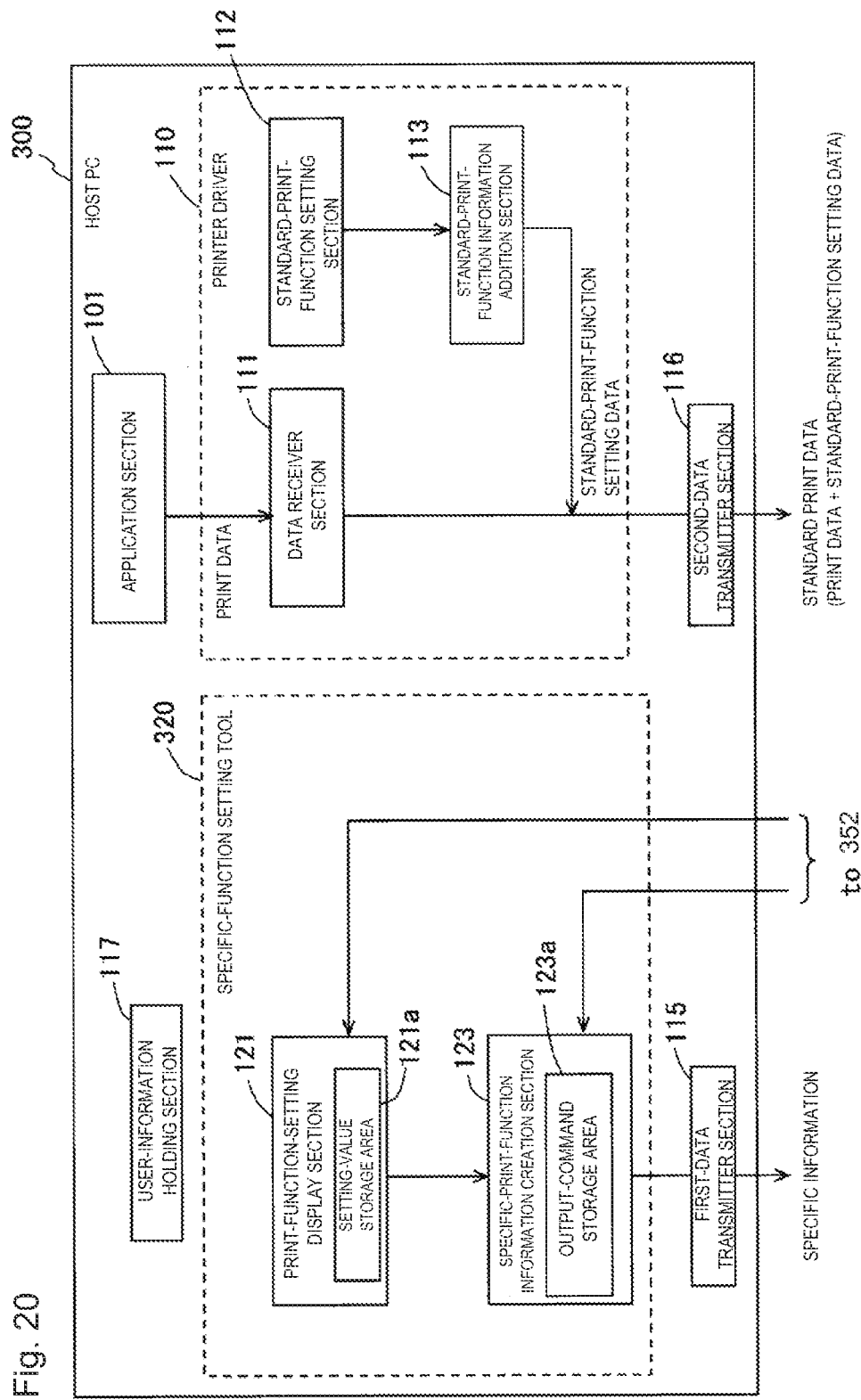
FIG. 20 is a block diagram illustrating a main-part configuration of a host terminal section of a host PC included in a print system according to a third embodiment of the invention.
Figure 21:
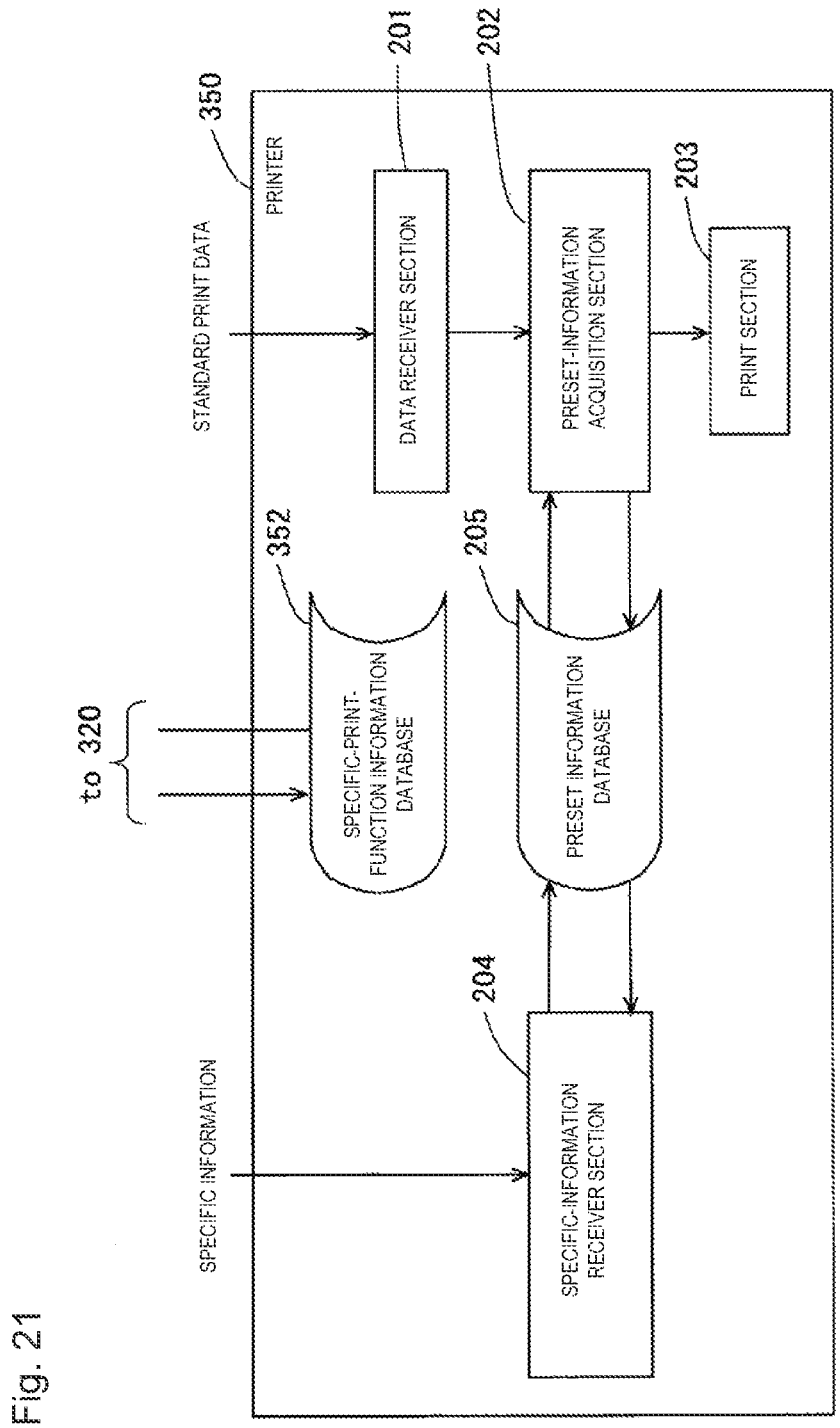
FIG. 21 is a block diagram illustrating a main-part configuration of a printer included in the print system according to the third embodiment of the invention.

FIG. 20 is a block diagram illustrating a main-part configuration of a host terminal section of host PC 300 included in a print system according to a third embodiment of the invention. FIG. 21 is a block diagram illustrating a main-part configuration of printer 350 included in the print system according to the third embodiment of the invention.

This print system adopting host PC 300 and printer 350 is different from the print system of the first embodiment illustrated in FIGS. 1 and 2, mainly in that specific-print-function information database 352 (corresponding to specific-print-function information database 122 in the first embodiment) is provided in printer 350, instead of being provided in host PC 300. Therefore, when a part of the print system according to the present embodiment is common to the corresponding part of the print system according to the first embodiment (FIGS. 1 and 2), this part is provided with the same reference numeral as that in the first embodiment or described without using the drawings. Accordingly, the difference is mainly described.

As illustrated in FIGS. 20 and 21, here, print-function-setting display section 121 and specific-print-function information creation section 123 of specific-function setting tool 320 are connected to be capable of communicating with specific-print-function information database 352 provided in printer 350.

In the thus-configured print system of the present embodiment, standard-printing-data generation processing, specific-information generation processing, preset-information registration processing, and printing processing to be performed by each section are similar to those described with reference to the flowcharts in FIGS. 13, 14, 15, and 16 in the first embodiment. Therefore, the description thereof is not provided.

Further, in specific-function setting tool 320, print-function-setting display section 121 acquires information by making access to specific-print-function information database 352 in printer 350, to display setting items and setting values for printing. However, when making access is unsuccessful due to, for example, a network failure, registration of preset information in printer 350 cannot be achieved, although this is a primary purpose of specific-function setting tool 320. Therefore, it is not necessary to provide alternative processing and the like.

In addition, for example, registration of information in specific-print-function information database 352 provided in printer 350 may be implemented in firmware at the time of releasing the printer. Further, after shipment of the printer, this registration may be performed in a webpage or the like implemented in an operation panel or an NIC of the printer by a pre-installed editor capable of editing functions settable for printing.

In the print system (see FIGS. 1 and 2) of the first embodiment, specific-print-function information database 122 that manages the specific print function information is provided in host PC 100. However, in the print system of the present embodiment, printer 350 is configured to include specific-print-function information database 352 that manages the specific print function information settable by specific-function setting tool 320, and to acquire data for specific information generation from specific-print-function information database 352.

In order to support different printers, the print system of the first embodiment needs specific-function setting tool 120 prepared for each of the printers, or needs the specific-print-function information for each of the printers held in specific-function setting tool 120. Therefore, in the print system of the first embodiment, which makes it necessary to update the specific-function setting tool each time a new printer is coped with, and which increases the size of the specific-function setting tool. In contrast, according to the print system of the present embodiment, each of the printers includes the specific-print-function information database that manages the specific print function information. Therefore, even if a new printer is handled, it is not necessary to update the specific-function setting tool and host PC 300 does not manage the specific print function information, and therefore, the size of specific-function setting tool 320 can be kept small.

Fourth Embodiment

Figure 22:
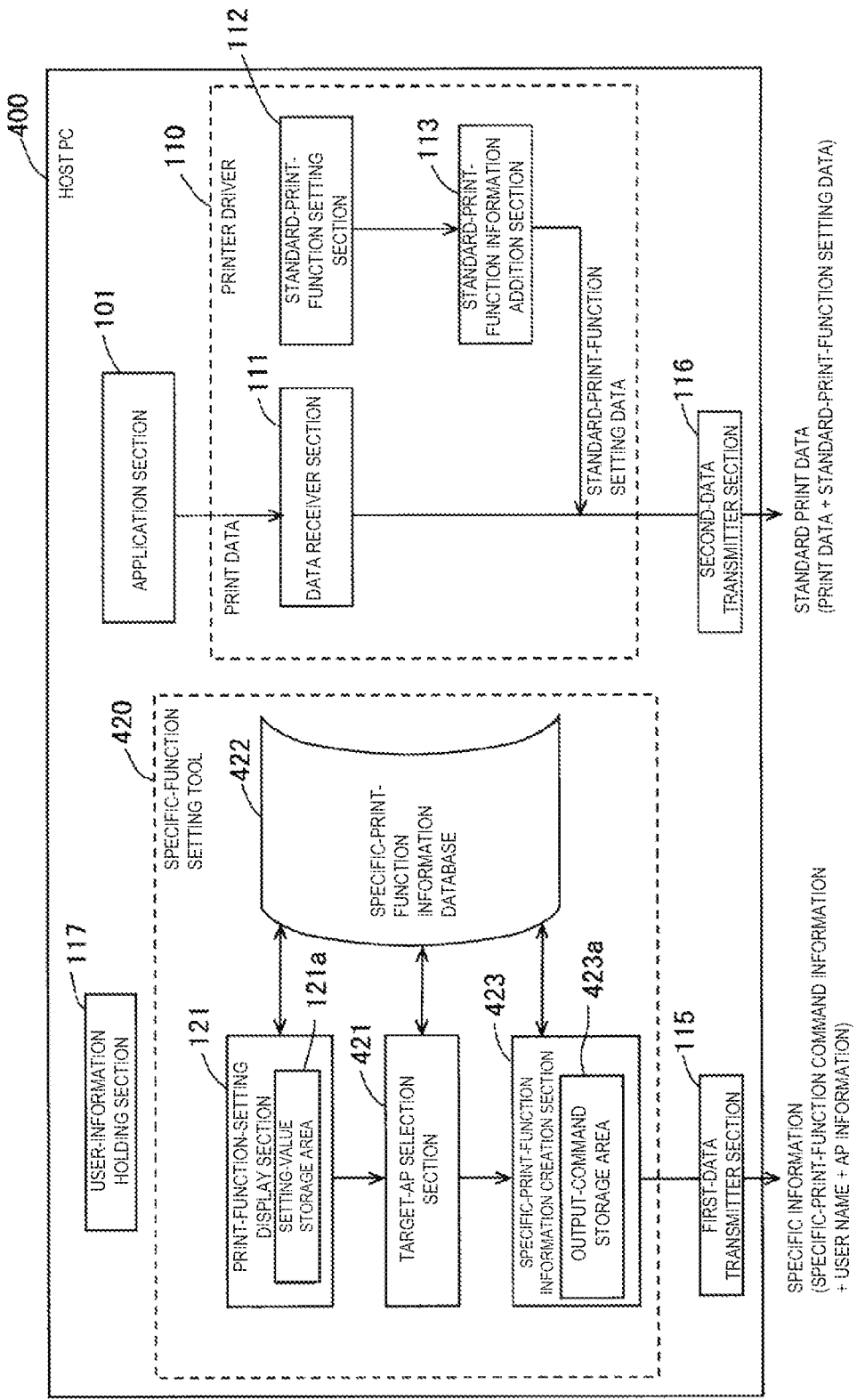
FIG. 22 is a block diagram illustrating a main-part configuration of a host terminal section of a host PC included in a print system according to a fourth embodiment of the invention.

FIG. 22 is a block diagram illustrating a main-part configuration of a host terminal section of host PC 400 included in a print system according to a fourth embodiment of the invention. FIG. 23 is a block diagram illustrating a main-part configuration of printer 450 included in the print system according to the fourth embodiment of the invention.

This print system adopting host PC 400 and printer 450 is different from the print system of the first embodiment illustrated in FIGS. 1 and 2, mainly in that specific-function setting tool 420 of host PC 400 includes target-AP selection section 421 and printer 450 includes AP-name acquisition section 456. For this reason, data processing in the print system is partially different from that in the first embodiment. Therefore, when a part of the print system according to the present embodiment is common to the corresponding part of the print system according to the first embodiment (FIGS. 1 and 2), this part is provided with the same reference numeral as that in the first embodiment or described without using the drawings. Accordingly, the difference is mainly described.

In FIG. 22, target-AP selection section 421 designates an application (AP) name to be a target of setting-value information set in print-function-setting display section 121. Target-AP selection section 421 displays an application (AP) setting dialogue illustrated in FIG. 24. In this application setting dialogue, an operator selects and designates an application name registered in specific-print-function information database 422. Alternatively, the operator designates an application name not registered in specific-print-function information database 422, by inputting an extension of a document thereof. The application name and the extension are to be added as attribute information.

In FIG. 23, AP-name acquisition section 456 extracts the application (AP) name serving as the attribute information included in standard-print-function setting data, from standard print data (print data+standard-print-function setting data) transmitted from printer driver 110 of host PC 400 and then held by data receiver section 451.

Figure 26:
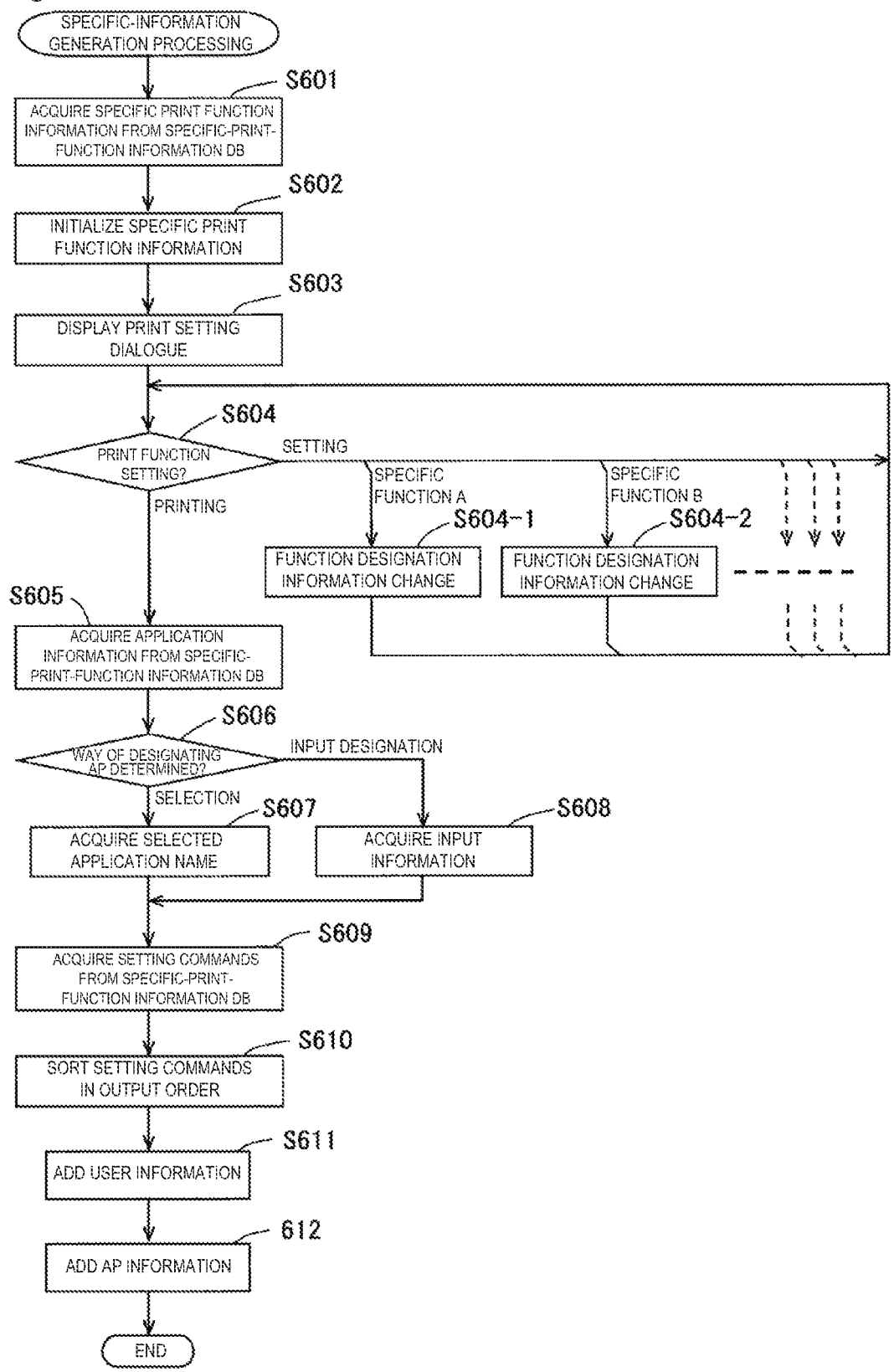
FIG. 26 is a flowchart illustrating a flow of specific-information generation processing by a specific-function setting tool of the host PC, in the fourth embodiment.
Figure 27:
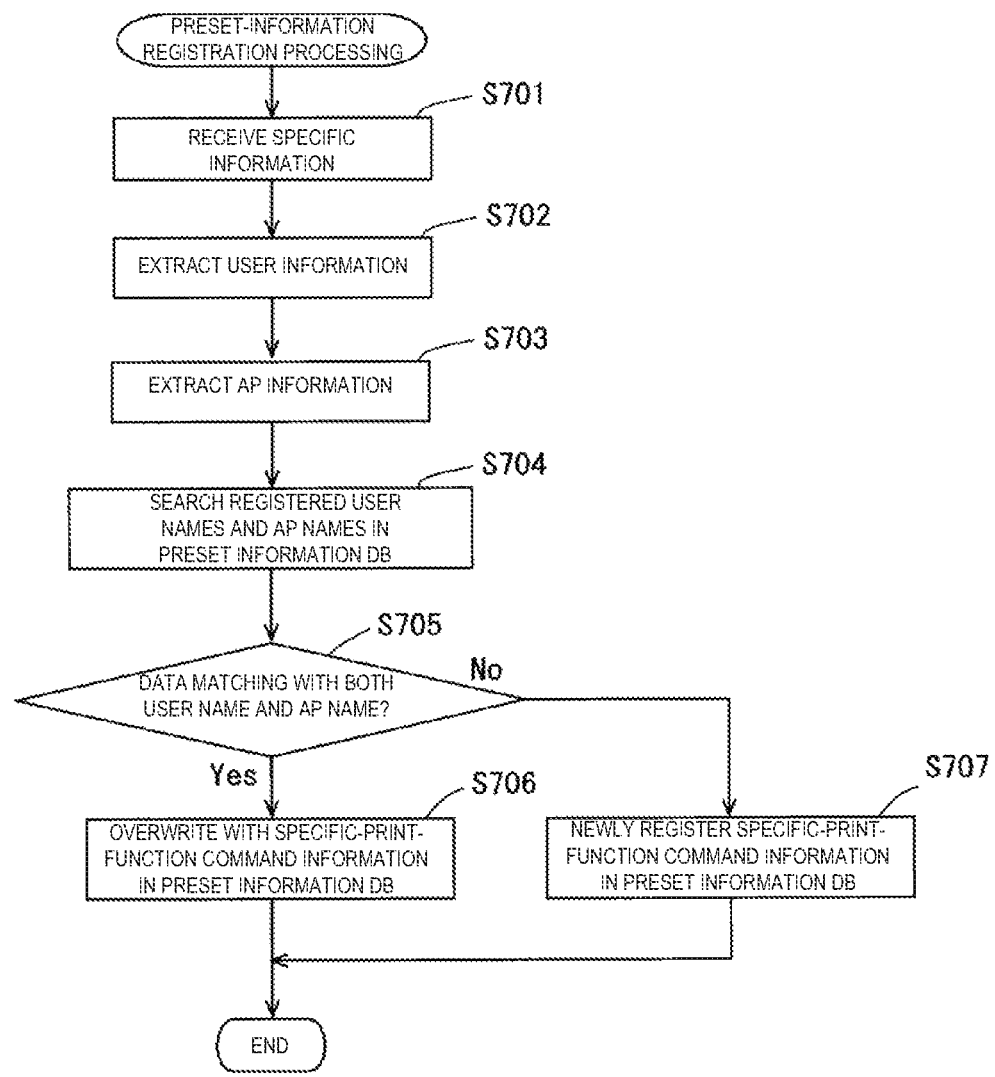
FIG. 27 is a flowchart illustrating a flow of preset-information registration processing by a specific-information receiver section of the printer, in the fourth embodiment.
Figure 28:
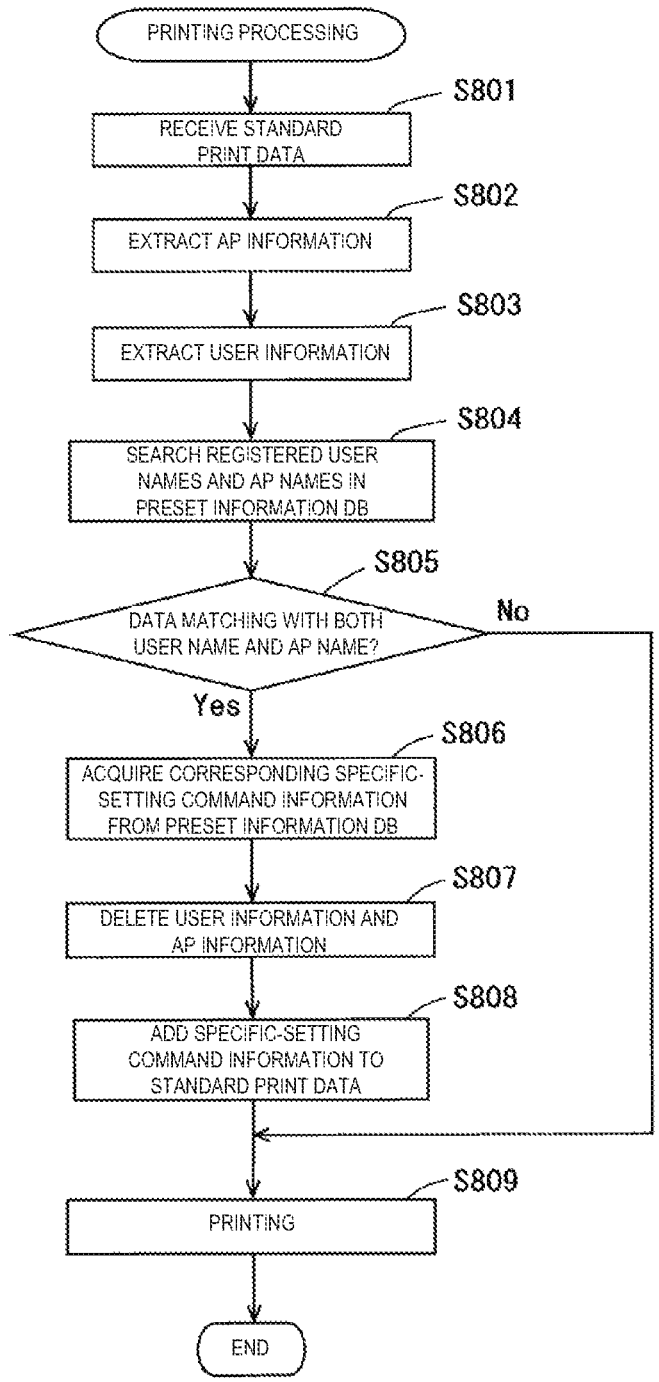
FIG. 28 is a flowchart illustrating a flow of printing processing by the printer, in the fourth embodiment.

Next, a flow of operation (data processing) in each section of host PC 400 and printer 450 is described with reference to a flowchart illustrated in each of FIGS. 26 to 28. Contents of standard-printing-data generation processing by printer driver 110 are similar to those described based on the flowchart illustrated in FIG. 13 in the first embodiment, and therefore are not described here.

First, specific-information generation processing by specific-function setting tool 420 of host PC 400 is described with reference to the flowchart illustrated in FIG. 26.

Print-function-setting display section 121 acquires settable specific print function information from specific-print-function information database 422 that manages the specific print function information (step S601). Print-function-setting display section 121 then stores each initial value of the specific print function information, namely, a default setting value, in setting-value storage area 121a (step S602). Print-function-setting display section 121 then displays the print setting dialogue (FIG. 6), using this default setting value as an initial setting value (step S603).

When the operator changes setting of the displayed specific print function information (SETTING in step S604), print-function-setting display section 121 performs as follows. As the operator selects and sets the above-described specific function such as the automatic tray switching function, the extra-fine-line correction function, and the color-matching precision function (indicated as SPECIFIC FUNCTIONS A, B, . . . in FIG. 26), print-function-setting display section 121 successively updates the setting-value information according to the change, and stores this information in setting-value storage area 121a (step S604-1, step S604-2, and so on).

When changing the specific print function setting is completed or when no function setting is performed (PRINTING in step S604), target-AP selection section 421 acquires an application that enables the specific print function set in print-function-setting display section 121. Specifically, first, target-AP selection section 421 acquires application information from specific-print-function information database 422 (step S605), thereby allowing the operator to select how to designate an application name (step S606). When the operator selects "APPLICATION NAME", i.e., the operator determines to select an application name displayed in the dialogue illustrated in FIG. 24 (SELECTION in step S606), target-AP selection section 421 acquires the selected application name (step S607). On the other hand, when the operator selects "FREE DESIGNATION" (INPUT DESIGNATION in step S606), target-AP selection section 421 acquires input information representing an inputted extension of a document (step S608).

Next, specific-print-function information creation section 423 acquires setting commands and a priority (order) corresponding to the setting value of each setting item. Specific-print-function information creation section 423 then stores the acquired setting commands and priority (order), in output-command storage area 423a (step S609), and sorts the stored setting commands in an output order based on the stored priority (order) information (step S610).

Finally, specific-print-function information creation section 423 adds a user name to specific-print-function command information representing the sorted setting commands to be stored in output-command storage area 423a (step S611). Further, specific-print-function information creation section 423 adds the application information acquired by target-AP selection section 421 (step S612), thereby completing the processing of creating the specific information (specific-print-function command information+user name+ AP information). The specific information created here is transmitted to specific-information receiver section 454 of printer 450.

User information (a login name) registered beforehand in a holding section (not illustrated) of host PC 400 is used as the initial value of the user name. However, as illustrated in FIG. 7, the user-name registration dialog may be displayed on print-function-setting display section 121, and an arbitrary user name may be registered in this dialog.

Next, preset-information registration processing by specific-information receiver section 454 of printer 450 is described with reference to the flowchart illustrated in FIG. 27.

Specific-information receiver section 454 receives the specific information transmitted from specific-function setting tool 420 of host PC 400, and holds the received specific information (step S701). Specific-information receiver section 404 then extracts the user information added to the specific information (step S702). Specific-information receiver section 454 extracts the application information that is also added to the specific information (step S703). Specific-information receiver section 454 then searches registered user names and registered application names in preset information database 455 (step S704). Specific-information receiver section 454 then determines whether data (preset information) matching with both the extracted specific-setting user name and the extract application name is included therein (step S705).

Here, preset information database 455 is described. FIG. 25 is a diagram schematically illustrating a data-holding configuration of preset information database 455. As illustrated in FIG. 25, preset information database 455 manages data registered or overwritten by specific-information receiver section 454. Here, as illustrated in FIG. 25, it is assumed that user names in a registered-user-name column are registered as a user name (1) to a user name (n). Further, in a registered-application-name column and a registered-setting-command-information column, an application name and specific-setting command information, which are obtained from the same specific information as that of each of the user names and both associated therewith, are registered, respectively.

If the data (preset information) matching with both the specific-setting user name and the application name that are newly extracted is included in the registered-application-name column and the registered-setting-command-information column, i.e., the preset information having the same specific-setting user name and the same application name as those newly extracted is already registered (Yes in step S705), specific-information receiver section 454 overwrites the corresponding registered specific-print-function command information (FIG. 25), with new specific-print-function command information (step S706).

On the other hand, if preset information matching with both the specific-setting user name and the application name that are newly extracted is not included, i.e., preset information having the same specific-setting user name and the same application name as those newly extracted is not registered (No in step S705), specific-information receiver section 454 newly registers preset information that associates the specific-setting user name, the application name, and the specific-print-function command information of the currently received specific information with one another, in preset information database 455 (step S707).

In this way, specific-information receiver section 454 updates the contents of preset information database 455, each time new specific information arrives. Therefore, as illustrated in FIG. 25, preset information database 455 keeps pieces of preset information that vary in combination of a user name and an application name.

Next, printing processing by printer 450 is described with reference to the flowchart illustrated in FIG. 28.

In printer 450, data receiver section 451 receives standard print data transmitted from printer driver 110 of host PC 400, and holds the received standard print data (step S801). AP-name acquisition section 456 extracts the application information included in the standard-print-function setting data, from this standard print data, and holds the extracted application information (step S802). Preset-information acquisition section 452 extracts the user information (the standard setting user name) included in the standard-print-function setting data, from this standard print data (step S803). Preset-information acquisition section 452 then searches the registered user names and the registered application names in preset information database 455 (step S804). Preset-information acquisition section 452 then determines whether data (preset information) matching with both the standard setting user name and the application name extracted from the standard print data is included therein (step 805).

If the data (preset information) matching with both the extracted standard setting user name and the extracted application name extracted is included in the registered-user-name column and the registered-application-name column, i.e., preset information having the same user name and the same application name as those extracted is already registered (Yes in step S805), preset-information acquisition section 452 acquires the specific-setting command information except the user name and the application name, from the corresponding preset information in preset information database 455 (step S806 and step S807). Preset-information acquisition section 452 then adds the acquired specific-setting command information to the standard-print-function setting data of the standard print data held by data receiver section 451, and transmits the result to print section 453 (step S808).

On the other hand, when data (preset information) matching with both the extracted standard setting user name and the extracted application name extracted is not included, i.e., preset information having the same user name and the same application name as those extracted is not registered (No in step S805), preset-information acquisition section 452 transmits the standard print data to print section 203, without adding any specific-setting command information to the standard print data. Print section 453 executes printing on a predetermined recording medium by an existing printing process, based on various function setting instructions accompanying the print data (step S809).

In the print system of the first embodiment, printing can be performed based on print setting that varies for each user. In contrast, in the print system of the present embodiment, printing can be performed based on print setting that varies each time either one of a user and an application is different.

The print system of the present embodiment can support a situation where a user desires to perform print setting that varies depending on the type of a document to be printed. For example, the user may desire to carry out color printing for a PowerPoint document, while wishing to carry out monochromatic printing for a Word document, and 4-up printing for a webpage. Therefore, print setting that supports a wider range of situations can be achieved.

Fifth Embodiment

Figure 29:
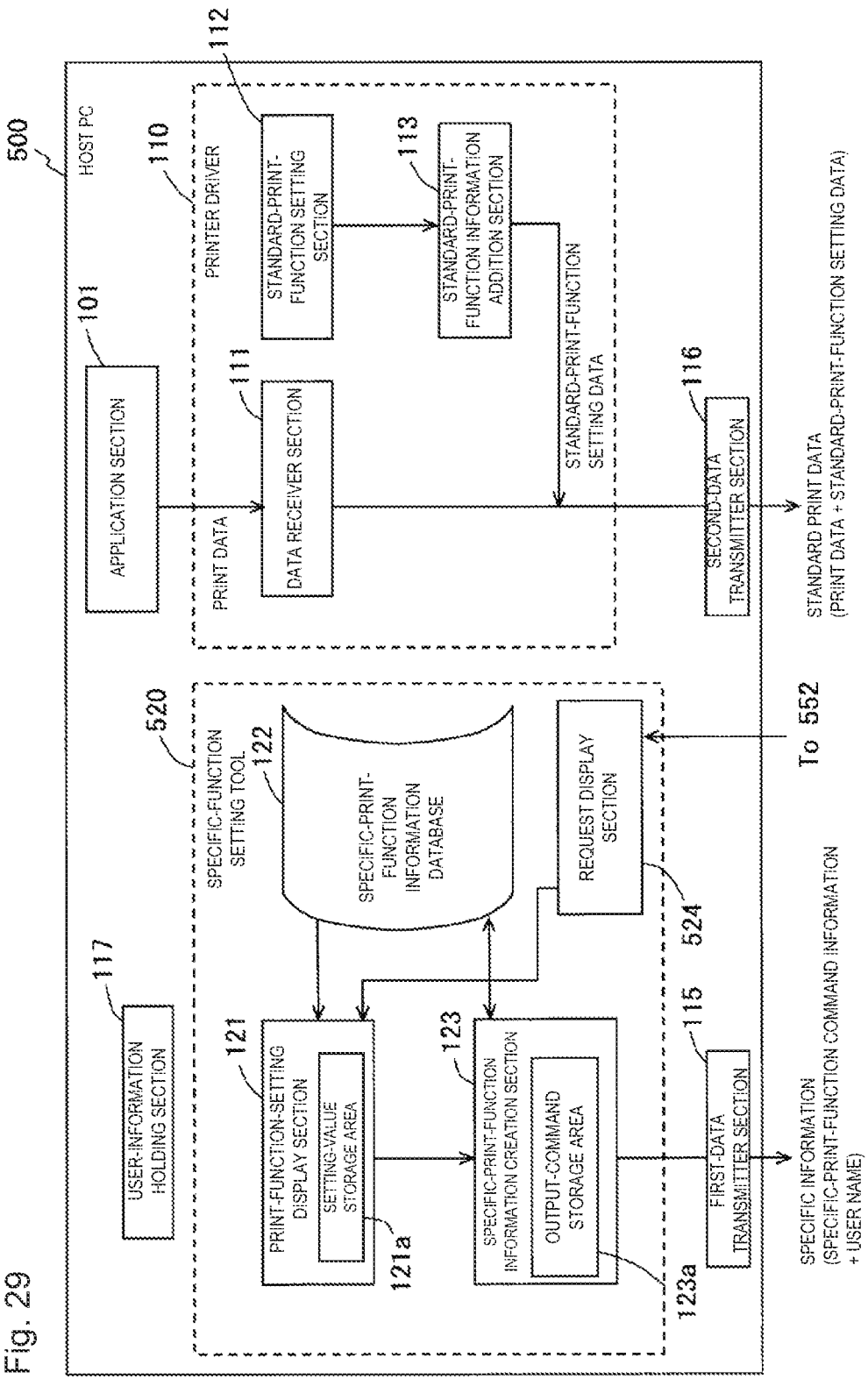
FIG. 29 is a block diagram illustrating a main-part configuration of a host terminal section of a host PC included in a print system according to a fifth embodiment of the invention.
Figure 30:
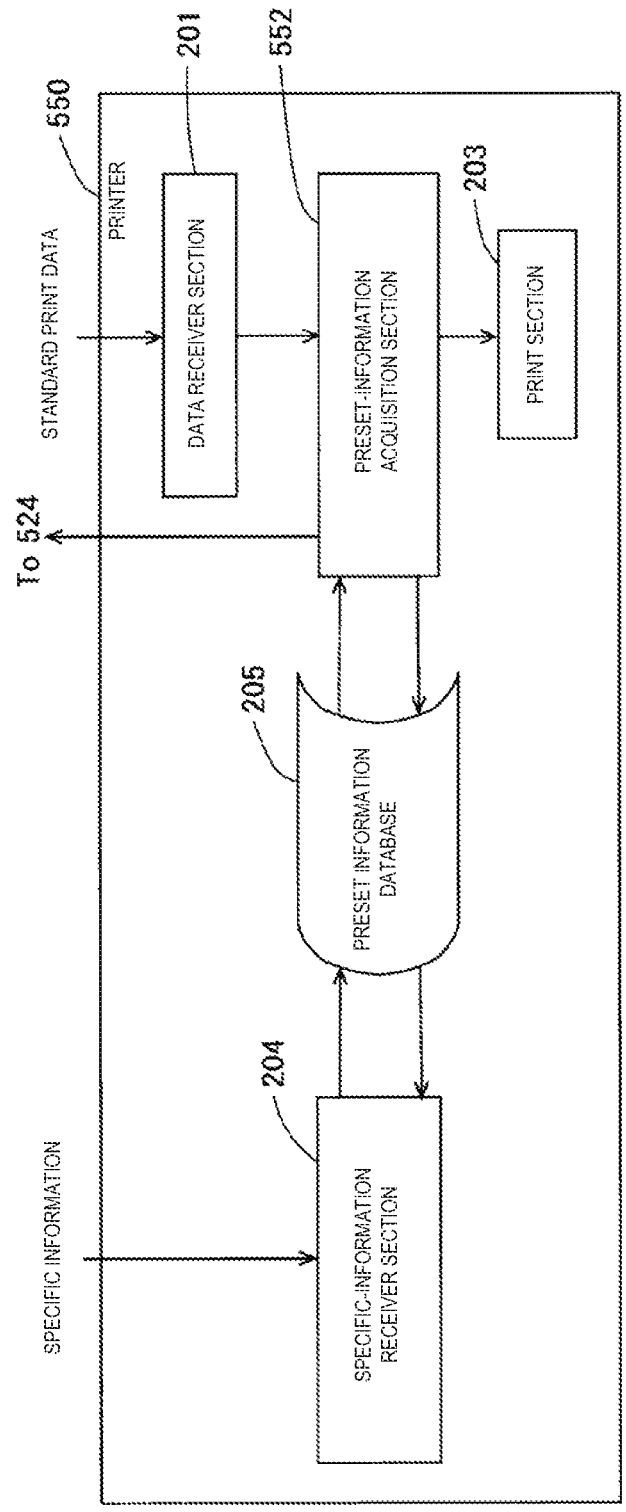
FIG. 30 is a block diagram illustrating a main-part configuration of a printer included in the print system according to the fifth embodiment of the invention.

FIG. 29 is a block diagram illustrating a main-part configuration of a host terminal section of host PC 500 included in a print system according to a fifth embodiment of the invention. FIG. 30 is a block diagram illustrating a main-part configuration of printer 550 included in the print system according to the fifth embodiment of the invention.

This print system adopting host PC 500 and printer 550 is different from the print system of the first embodiment illustrated in FIGS. 1 and 2, mainly in that specific-function setting tool 520 of host PC 500 includes request display section 524. For this reason, data processing in specific-function setting tool 520 and preset-information acquisition section 552 of printer 550 is partially different from that in the first embodiment. Therefore, when a part of this print system according to the present embodiment is common to the corresponding part of the print system according to the first embodiment (FIGS. 1 and 2), this part is provided with the same reference numeral as that in the first embodiment or described without using the drawings. Accordingly, the difference is mainly described.

In host PC 500 illustrated in FIG. 29, contents of standard-printing-data generation processing by printer driver 110 are similar to those described based on the flowchart illustrated in FIG. 13 in the first embodiment, and therefore are not described here.

In specific-function setting tool 520 illustrated in FIG. 29, request display section 524 serving as a notification unit displays a message in response to a request from preset-information acquisition section 552 of printer 550 (FIG. 30) to be described later. The message displays contents prompting generation of new specific information (preset information) and registration of the new specific information in preset information database 205.

Printer 550 illustrated in FIG. 30 is similar to that in the first embodiment, in terms of the configurations of specific-information receiver section 204 and preset information database 205, as well as the preset-information registration processing for preset information database 205 illustrated in the flowchart of FIG. 15. Therefore, these configurations and processing are not described here.

In printer 550 illustrated in FIG. 30, data receiver section 201 receives standard print data (print data+standard-print-function setting data) transmitted from printer driver 110 of host PC 500 (FIG. 29), and holds the received standard print data. Preset-information acquisition section 552 extracts user information included in the standard-print-function setting data from the standard print data held by data receiver section 201. The user name extracted here from the standard print data is referred to as "standard setting user name".

Preset-information acquisition section 552 searches registered user names in preset information database 205, and determines whether the standard setting user name extracted from the standard print data held by data receiver section 201 is included therein. If the standard setting user name is registered in preset information database 205, and the corresponding specific-setting command information is present, preset-information acquisition section 552 acquires the corresponding specific-setting command information from preset information database 205, and adds the acquired specific-setting command information to the standard-print-function setting data of the standard print data held by data receiver section 201. Preset-information acquisition section 552 then transmits the result to print section 203. Print section 203 executes printing on a predetermined recording medium by an existing printing process based on various function setting instructions accompanying the print data.

When the standard setting user name is not registered in preset information database 205, preset-information acquisition section 552 issues a request to newly generate corresponding specific information (preset information) including specific-print-function command information and a user name by using specific-function setting tool 520 (FIG. 29). Therefore, in order that a user name of the specific information (preset information) to be newly created in response to the request becomes the standard setting user name extracted here, preset-information acquisition section 552 also attaches the standard setting user name when issuing the request.

Figure 31:
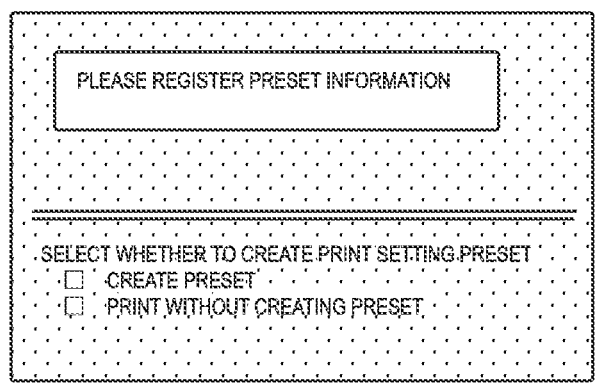
FIG. 31 is a diagram illustrating an example of a message displayed by a request display section, in the fifth embodiment.

Request display section 524 displays the message having contents prompting an operator to create specific information in response to this request. Request display section 524 also displays a dialogue that allows the operator to determine whether to create the specific information (preset information) as described later, upon reading this message. FIG. 31 is a diagram illustrating an example of the message displayed by request display section 524.

Next, a flow of operation (data processing) in specific-function setting tool 520 of host PC 500 and preset-information acquisition section 552 of printer 550 is described with reference to a flowchart illustrated in each of FIGS. 32 and 33.

First, printing processing by printer 550 is described with reference to the flowchart illustrated in FIG. 32.

In printer 550, data receiver section 201 receives the standard print data transmitted from printer driver 110 of host PC 500, and holds the received standard print data (step S901). Preset-information acquisition section 552 then extracts the user information (the standard setting user name) included in the standard-print-function setting data, from this standard print data (step S902). Preset-information acquisition section 552 then searches the registered user names (see FIG. 8) in preset information database 205 (step S903), and determines whether the standard setting user name extracted from the standard print data is included therein (step S904).

It is assumed that, in this process, preset information database 205 keeps pieces of specific information (preset information) formed by the specific-information generation processing represented by the flowchart in FIG. 14 of the first embodiment or by specific-information generation processing illustrated in FIG. 33 to be described later.

If the standard setting user name extracted from the standard print data is not included in the registered user names in preset information database 205, i.e., the applicable user name is not present in preset information database 205 (No in step S904), preset-information acquisition section 552 issues a request to newly generate specific information (preset information), to specific-function setting tool 520 (FIG. 29), upon attaching the standard setting user name extracted here (step S905). In response to this request, request display section 524 of specific-function setting tool 520 displays, for example, the dialogue having the contents illustrated in FIG. 31, as described later.

On the other hand, if the standard setting user name extracted from the standard print data is included in the registered user names, i.e., the applicable user name is present in preset information database 205 (Yes in step S904), then preset-information acquisition section 552 determines whether the specific-setting command information corresponding to the user name is also present (step S906). As described later, the determination is performed here, because, when the operator selects "PRINT WITHOUT CREATING PRESET" in the dialogue illustrated in FIG. 31, preset information having no specific-setting command information corresponding to the user name searched for is present in preset information database 205.

Here, when the specific-setting command information corresponding to the user name is present (Yes in step S906), preset-information acquisition section 552 acquires the corresponding specific-setting command information from preset information database 205 (step S907). Preset-information acquisition section 552 then adds the acquired specific-setting command information to the standard-print-function setting data of the standard print data held by data receiver section 201, and then transmits the result to print section 203 (step S908).

On the other hand, when the specific-setting command information corresponding to the user name is not present (No in step S906), preset-information acquisition section 552 deletes this user name having no corresponding specific-setting command information from preset information database 205 (step S909). Preset-information acquisition section 552 then transmits the standard print data to print section 203, without adding any specific-setting command information. Print section 203 executes printing on a predetermined recording medium by an existing printing process, based on various function setting instructions accompanying the print data (step S910).

Next, specific-information generation processing by specific-function setting tool 520 of host PC 500 is described with reference to the flowchart illustrated in FIG. 33.

Figure 32:
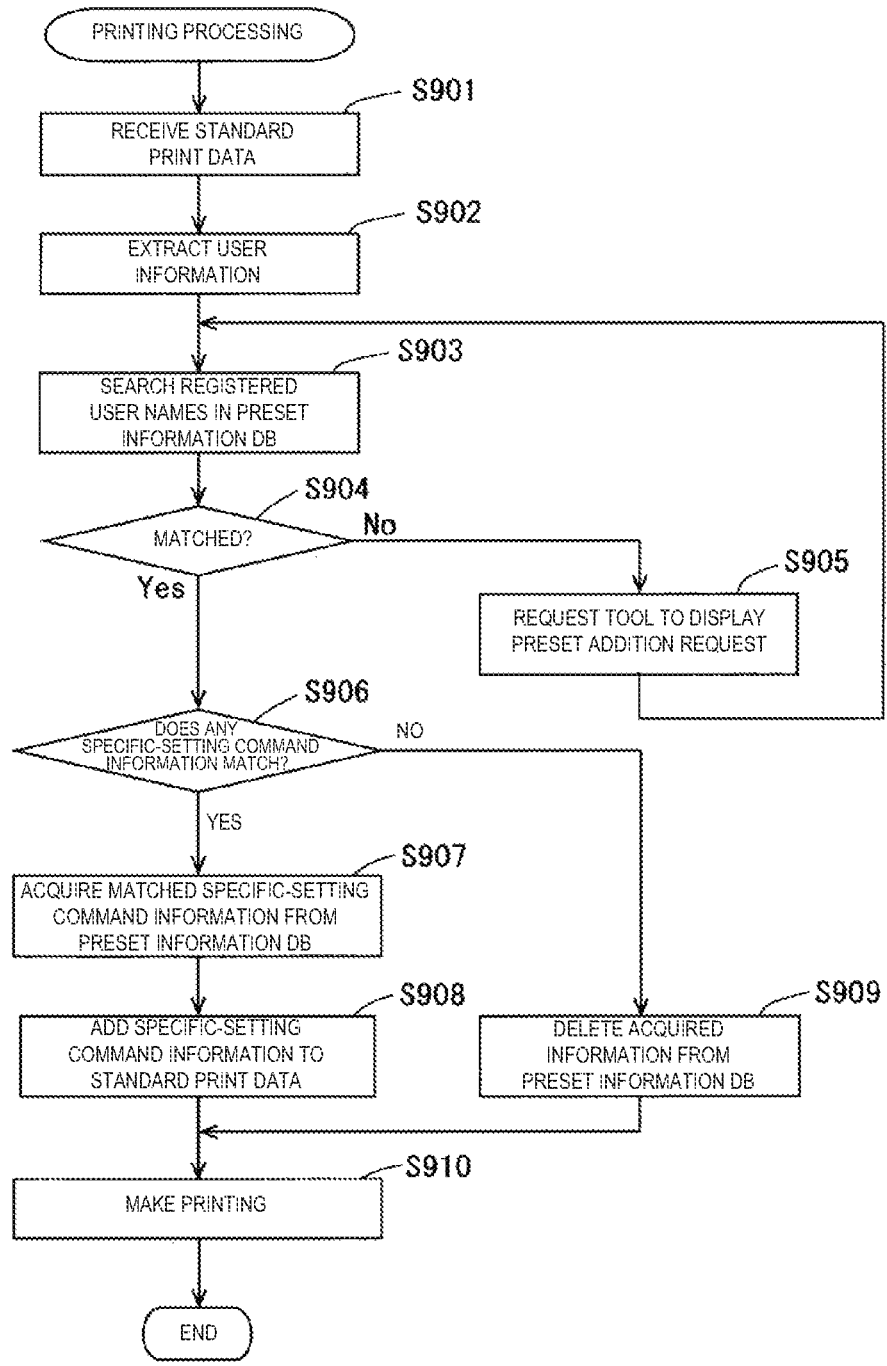
FIG. 32 is a flowchart illustrating a flow of printing processing by the printer, in the fifth embodiment.
Figure 33:
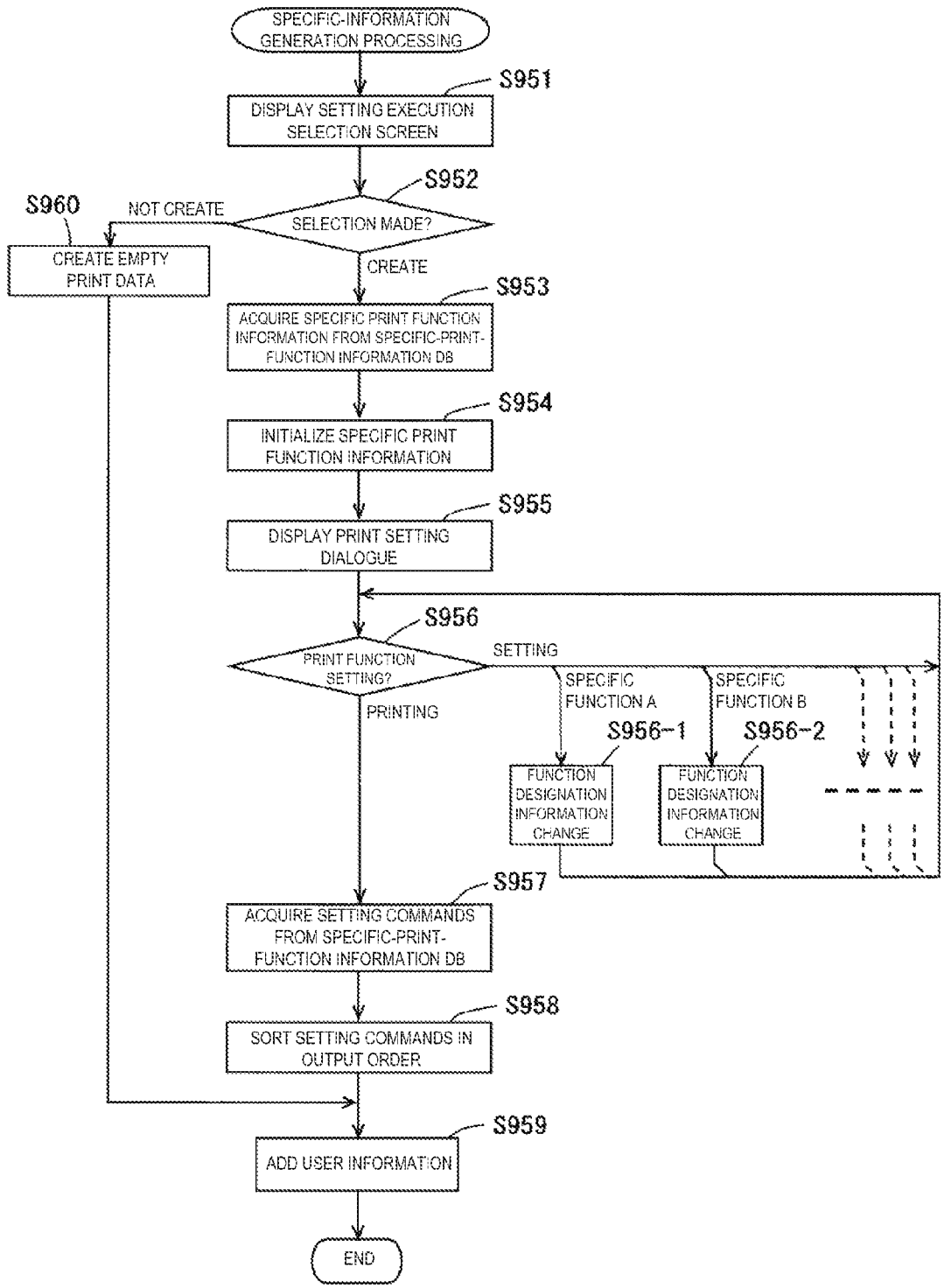
FIG. 33 is a flowchart illustrating a flow of specific-information generation processing by a specific-function setting tool of the host PC, in the fifth embodiment.

The flowchart illustrated in FIG. 33 represents specific-information generation processing to be performed when the request to newly generate the specific information (preset information) is issued from preset-information acquisition section 552 of printer 550 (see step S905 in FIG. 32). Normal specific-information generation processing other than this processing is performed based on the flowchart in FIG. 14 described in the first embodiment.

When the request to newly generate specific information (preset information) is issued from preset-information acquisition section 552 of printer 550, request display section 524 displays the dialogue illustrated in FIG. 31 (step S951). Specific-function setting tool 520 monitors whether the operator selects creation of new specific information (preset information) on this screen (step S952).

When the operator selects "CREATE" (CREATE in step S952), specific-function setting tool 520 creates specific information (specific-print-function command information+user name) in processing from step S953 to step S959, and then transmits the created specific information to specific-information receiver section 204 of printer 550. This processing from step S953 to step S959 is similar to the processing in step S201 to step S207 in the flowchart of FIG. 14 performed by specific-function setting tool 120 (FIG. 1) in the first embodiment, and therefore is not described here. However, in step S959, specific-function setting tool 520 attaches the standard setting user name previously transmitted from preset-information acquisition section 552.

On the other hand, when the operator selects "NOT CREATE" (NOT CREATE in step S952), specific-function setting tool 520 creates no specific-print-function command information (step S960), and transmits the specific information (only the user name) to which only the user information is added, to specific-information receiver section 204 of printer 550 (step S959).

Specific-information receiver section 204 of printer 550 performs preset-information registration processing for registration in preset information database 205 based on the flowchart in FIG. 15 described in the first embodiment. Therefore, in addition to the preset information in which the user name registered in the registered-user-name column is associated with the specific-setting command information registered in the registered-setting-command-information column as illustrated in FIG. 8, the user name having no corresponding specific-print-function command information is registered in the registered-user-name column in preset information database 205.

In the print system of the second embodiment described above, the printing is suspended when there is no preset information registered in printer 250 (FIG. 17), and printer panel display section 260 in printer 250 displays the message promoting the registration of the preset information. In contrast, in the print system of the present embodiment, host PC 500 (FIG. 29) displays a similar message, and registers the preset information including at least the requested user name, after allowing the operator to select the contents of the preset information to be newly registered, i.e., whether to add the specific-setting command information.

Therefore, even if there is no registered preset information at the time of printing, the printing proceeds in a state where a print function is reinforced by the newly registered preset information, or proceeds using a basic print function, whichever determined by the operator.

As described above, according to the print system of the present embodiment, when there is no preset information in the printer, the host PC is caused to display the message requesting registration of preset information. Therefore, it is possible to register the preset information more quickly.

It is to be noted that the fourth embodiment is described using the example in which printing can be performed based on print setting that varies each time either one of a user and an application is different, under the configuration of the first embodiment. However, the fourth embodiment is applicable to, for example, the configuration in which the printer includes the specific-print-function information database as described in the third embodiment. Further, the fourth embodiment is applicable to the configuration in which the printing processing is performed based on the determination made by the operator after the message is displayed to the operator by the display unit, as described in the second and fifth embodiments.

The embodiments are each described using the example of adopting the printer in the print system. However, the invention is not limited to the printer, and similarly applicable to apparatuses such as a multifunction peripheral (MFP), a facsimile, and a copier.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A print system comprising:
a print-function-information holding section;
a host terminal; and
an image formation apparatus,
wherein the print system performs printing by transmitting print data from the host terminal to the image formation apparatus,
wherein the host terminal comprises a first processor configured to execute a first control program that causes the first processor to perform operations comprising:
operation as a print-function setting section that performs print setting based on print function information held by the print-function-information holding section, and
operation as first and second transmitter sections that transmit first data including the print setting and first determination information including a name of an application, and second data including the print data and second determination information including a name of an application that has created the print data, and
wherein the image formation apparatus includes a second processor configured to execute a second control program that causes the second processor to perform operations comprising;
operation as first and second receiver sections that receive the first data and the second data,
operation as an acquisition section that performs print setting based on the first data, if the first determination information and the second determination information match with each other, and
wherein the image formation apparatus further includes a printer section that prints the print data based on the print setting.

2. The print system according to claim 1, wherein when the second determination information does not match any of the print function information held by the print-function-information holding section, a print job is suspended and a user associated with the second determination information is prompted to register corresponding print function information in the print-function-information holding section.

3. The print system according to claim 1, wherein the host terminal outputs the first data after outputting the second data.

4. The print system according to claim 1, further comprising a display section,
wherein, when there is a mismatch between the first determination information and the second determination information, the acquisition section causes the display section to notify the mismatch.

5. A print system comprising:
a print-function-information holding section;
a host terminal; and
an image formation apparatus,
wherein the print system performs printing by transmitting print data from the host terminal to the image formation apparatus,
wherein the host terminal comprises a first processor configured to execute a first control program that causes the first processor to perform operations comprising:
an operation as a print-function setting section that performs print setting based on print function information held by the print-function-information holding section, and
operations as first and second transmitter sections that transmit first data associating the print setting with first determination information, and second data associating the print data with second determination information, and
wherein the image formation apparatus includes a second processor configured to execute a second control program that causes the second processor to perform operations comprising:
operation as first and second receiver sections that receives the first data and the second data,
operation as an acquisition section that performs print setting based on the first data, if the first determination information added to the first data and the second determination information added to the second data match with each other, and
wherein the image formation apparatus further includes a printer section that prints the print data based on the print setting,
wherein
the image formation apparatus further includes a preset-information holding section that stores the received first data,
the image formation apparatus compares the first determination information of the first data newly received with the first determination information of the first data stored in the preset-information holding section, and
if there is a match, the image formation apparatus updates a content of the matched and stored first data, or if there is no match, the image formation apparatus additionally stores the newly received first data in the preset-information holding section.

6. The print system according to claim 5, wherein
the second control program causes the second processor to perform operations such that operation as the acquisition section further includes operation as a determination section that compares the first determination information of the first data stored in the preset-information holding section with the second determination information.

7. The print system according to claim 5, wherein when the second determination information does not match any of the print function information held by the print-function-information holding section, a print job is suspended and a user associated with the second determination information is prompted to register corresponding print function information in the print-function-information holding section.

8. The print system according to claim 5, wherein the host terminal outputs the first data after outputting the second data.

9. The print system according to claim 5, further comprising a display section,
wherein, when there is a mismatch between the first determination information and the second determination information, the operation as the acquisition section causes the display section to notify the mismatch.

* * * * *